(12) United States Patent
Lee et al.

(10) Patent No.: US 12,200,203 B2
(45) Date of Patent: Jan. 14, 2025

(54) IMAGE ENCODING/DECODING METHOD AND DEVICE, AND RECORDING MEDIUM USING INTRA PREDICTION BASED ON REFERENCE SAMPLES OF REFERENCE SAMPLE LINE

(71) Applicant: Electronics and Telecommunications Research Institute, Daejeon (KR)

(72) Inventors: Jin Ho Lee, Daejeon (KR); Jung Won Kang, Daejeon (KR); Ha Hyun Lee, Seoul (KR); Sung Chang Lim, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/879,237

(22) Filed: Aug. 2, 2022

(65) Prior Publication Data

US 2022/0377323 A1    Nov. 24, 2022

Related U.S. Application Data

(63) Continuation of application No. 17/277,597, filed as application No. PCT/KR2019/012060 on Sep. 18, 2019, now Pat. No. 11,445,185.

(30) Foreign Application Priority Data

Sep. 19, 2018  (KR) .................. 10-2018-0112011
Sep. 27, 2018  (KR) .................. 10-2018-0114690
Nov. 12, 2018  (KR) .................. 10-2018-0137879

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/117* (2014.11); *H04N 19/176* (2014.11); *H04N 19/593* (2014.11)

(58) Field of Classification Search
None
See application file for complete search history.

(56) References Cited

U.S. PATENT DOCUMENTS

2007/0140574 A1  6/2007  Yamaguchi et al.
2014/0072048 A1  3/2014  Ma et al.
(Continued)

FOREIGN PATENT DOCUMENTS

CN    103988506 A    8/2014
CN    104937941 A    9/2015
(Continued)

OTHER PUBLICATIONS

Po-Han Lin et al., Multiple reference line intra prediction based on JEM7.0, Joint Video Exploration Team (JVET) of ITU-T SG 16 WP 3 and ISO/IEC JTC 1/SC 29/WG 11, JVET-J0070, 10th Meeting: San Diego, US, Apr. 10-20, 2018, ITRI International.
(Continued)

*Primary Examiner* — Chikaodili E Anyikire
(74) *Attorney, Agent, or Firm* — BROADVIEW IP LAW, PC

(57) ABSTRACT

An image encoding/decoding method is disclosed. An image decoding method of the present invention may comprise deriving an intra-prediction mode of a current block by using an intra-prediction mode of a neighbor block adjacent to the current block, configuring a reference sample of the current block, and performing intra-prediction on the current block by using the intra-prediction mode and the reference sample, wherein when the intra-prediction mode of the
(Continued)

neighbor block is unavailable, the intra-prediction mode of the neighbor block may be replaced with a planar mode.

3 Claims, 17 Drawing Sheets

(51) Int. Cl.
*H04N 19/117* (2014.01)
*H04N 19/176* (2014.01)
*H04N 19/593* (2014.01)

(56) References Cited

U.S. PATENT DOCUMENTS

| | | | |
|---|---|---|---|
| 2018/0098064 A1* | 4/2018 | Seregin | H04N 19/11 |
| 2019/0182481 A1* | 6/2019 | Lee | H04N 19/11 |
| 2019/0306532 A1 | 10/2019 | Ikonin | |
| 2020/0007895 A1 | 1/2020 | Auwera et al. | |
| 2020/0244956 A1 | 7/2020 | Lee et al. | |
| 2021/0051319 A1* | 2/2021 | Kim | H04N 19/46 |
| 2021/0092362 A1* | 3/2021 | Lee | H04N 19/159 |
| 2021/0176493 A1* | 6/2021 | Wang | H04N 19/176 |
| 2021/0203928 A1 | 7/2021 | Filippov et al. | |
| 2021/0360226 A1 | 11/2021 | Yoo et al. | |

FOREIGN PATENT DOCUMENTS

| | | |
|---|---|---|
| KR | 1020170054561 A | 5/2017 |
| KR | 1020180001479 A | 1/2018 |
| WO | 2013058520 A1 | 4/2013 |
| WO | 2018/111132 A1 | 6/2018 |
| WO | 2018124843 A1 | 7/2018 |

OTHER PUBLICATIONS

Sunmi Yoo et al., CE3-2.3.3 and CE3-2.3.4:Interpolation filter selection regarding intra mode and block size, Joint Video Experts Team (JVET) of ITU-T SG 16 WP 3 and ISO/IEC JTC 1/SC 29/WG 11, JVET-K0097, 11th Meeting: Ljubljana, SI, Jul. 10-18, 2018, LG Electronics Inc.

Chang, Yao-Jen et al. "Arbitrary reference tier for intra directional modes," Joint Video Exploration Team (JVET) of ITU-T SG 16 WP 3 and ISO/IEC JTC 1/SC 29/WG 11. JVET-C0043r1. May 2016.

Li, Jiahao et al. "Multiple line-based intra prediction," Joint Video Exploration Team (JVET) of ITU-T SG 16 WP 3 and ISO/IEC JTC 1/SC 29/WG 11. JVET-C0071. May 2016.

Van Der Auwera, Geert et al. "Description of Core Experiment 3: Intra Predicition and Mode Coding," Joint Video Experts Team (JVET) of ITU-T SG 16 WP 3 and ISO/IEC JTC 1/SC 29/WG 11. JVET-J1023_r2. Apr. 2018.

Van Der Wauwera, Geert et al. "Description of Core Experiment 3: Intra Prediction and Mode Coding," Joint Video Experts Team (JVET) of ITU-T SG 16 WP 3 and ISO/IEC JTC 1/SC 29/WG 11. JVET-K1023-v3. Jul. 2018.

* cited by examiner

| Phase | 4-tap Cubic filter | | | |
|---|---|---|---|---|
| 0 | 0 | 256 | 0 | 0 |
| 1 | -3 | 252 | 8 | -1 |
| 2 | -5 | 247 | 17 | -3 |
| 3 | -7 | 242 | 25 | -4 |
| 4 | -9 | 236 | 34 | -5 |
| 5 | -10 | 230 | 43 | -7 |
| 6 | -12 | 224 | 52 | -8 |
| 7 | -13 | 217 | 61 | -9 |
| 8 | -14 | 210 | 70 | -10 |
| 9 | -15 | 203 | 79 | -11 |
| 10 | -16 | 195 | 89 | -12 |
| 11 | -16 | 187 | 98 | -13 |
| 12 | -16 | 179 | 107 | -14 |
| 13 | -16 | 170 | 116 | -14 |
| 14 | -17 | 162 | 126 | -15 |
| 15 | -16 | 153 | 135 | -16 |
| 16 | -16 | 144 | 144 | -16 |

| Phase | 4-tap Gaussian filter | | | |
|---|---|---|---|---|
| 0 | 64 | 128 | 64 | 0 |
| 1 | 43 | 161 | 51 | 1 |
| 2 | 40 | 160 | 54 | 2 |
| 3 | 37 | 159 | 58 | 2 |
| 4 | 34 | 158 | 62 | 2 |
| 5 | 31 | 156 | 67 | 2 |
| 6 | 28 | 154 | 71 | 3 |
| 7 | 26 | 151 | 76 | 3 |
| 8 | 23 | 149 | 80 | 4 |
| 9 | 21 | 146 | 85 | 4 |
| 10 | 19 | 142 | 90 | 5 |
| 11 | 17 | 139 | 94 | 6 |
| 12 | 16 | 135 | 99 | 6 |
| 13 | 14 | 131 | 104 | 7 |
| 14 | 13 | 127 | 108 | 8 |
| 15 | 11 | 123 | 113 | 9 |
| 16 | 10 | 118 | 118 | 10 |

IMAGE ENCODING/DECODING METHOD AND DEVICE, AND RECORDING MEDIUM USING INTRA PREDICTION BASED ON REFERENCE SAMPLES OF REFERENCE SAMPLE LINE

CROSS-REFERENCE TO RELATED APPLICATIONS

The present application is a continuation application of U.S. application Ser. No. 17/277,597, filed on Mar. 18, 2021, which was the National Stage of International Application No. PCT/KR2019/012060 filed on Sep. 18, 2019, which claims priority to Korean Patent Applications: KR10-2018-0112011, filed on Sep. 19, 2018, KR10-2018-0137879, filed on Nov. 12, 2018, and KR10-2018-0114690, filed on Sep. 27, 2018, with the Korean Intellectual Property Office, which are incorporated herein by reference in their entirety.

TECHNICAL FIELD

The present invention relates to a method and apparatus for encoding/decoding an image. Particularly, the present invention relates to a method and apparatus for encoding/decoding an image performing intra prediction having improved encoding/decoding efficiency.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

DISCLOSURE

Technical Problem

An object of the present invention is to provide an image encoding/decoding method and apparatus with improved encoding/decoding efficiency.

Another object of the present invention is to provide an image encoding/decoding method and apparatus performing intra prediction with improved encoding/decoding efficiency.

Another object of the present invention is to provide a recording medium storing a bitstream generated by an image encoding method/apparatus of the present invention.

Another object of the present invention is to provide a recording medium storing a bitstream which is received, decoded and used by an image decoding apparatus according to the present invention to reconstruct an image.

Technical Solution

An image decoding method according to an embodiment of the present invention may comprise deriving an intra-prediction mode of a current block by using an intra-prediction mode of a neighbor block adjacent to the current block, configuring a reference sample of the current block, and performing intra-prediction on the current block by using the intra-prediction mode of the current block and the reference sample, wherein when the intra-prediction mode of the neighbor block is unavailable, the intra-prediction mode of the neighbor block may be replaced with a planar mode.

In the image decoding method of the present invention, the deriving of the intra-prediction mode of the current block may comprise deriving intra-prediction modes of multiple neighbor blocks adjacent to the current block, selecting a mode corresponding to a maximum value of an MPM candidate in an MPM list among the derived intra-prediction modes of the neighbor blocks, and configuring the MPM list including the mode corresponding to the maximum value.

In the image decoding method of the present invention, the deriving of the intra-prediction mode of the current block may comprise deriving intra-prediction modes of multiple neighbor blocks adjacent to the current block, selecting a mode corresponding to a maximum value of an MPM candidate in an MPM list and a mode corresponding to a minimum value of the MPM candidate in the MPM list among the derived intra-prediction modes of the neighbor blocks, and configuring the MPM list including the mode corresponding to the maximum value and the mode corresponding to the minimum value, wherein the MPM list may be configured to further include an additional mode derived by adding a predetermined offset to the mode corresponding to the maximum value or the mode corresponding to the minimum value.

In the image decoding method of the present invention, the deriving of the additional mode may be differently performed according to a difference value between the maximum value and the minimum value.

In the image decoding method of the present invention, the deriving of the intra-prediction mode of the current block may comprise deriving intra-prediction modes of multiple neighbor blocks adjacent to the current block, and configuring an MPM list on the basis of the derived intra-prediction modes of the neighbor block, wherein when all of the derived intra-prediction modes of the neighbor blocks are non-directional modes, the MPM list may be configured to include to a vertical mode, a horizontal mode, and a mode obtained by adding a predetermined offset to the vertical mode.

In the image decoding method of the present invention, the configuring of the reference sample may comprise selecting one reference sample line to be used for intra-prediction among multiple reference sample lines, and performing filtering on the reference sample, wherein whether or not to perform the filtering on the reference sample may be determined on the basis of at least one among the intra-prediction mode of the current block, a size of the current block, and the selected reference sample line.

In the image decoding method of the present invention, when the selected reference sample line is not a first reference sample line, the filtering on the reference sample may not be performed.

In the image decoding method of the present invention, when a number of samples included in the current block is smaller than 32, the filtering on the reference sample may not be performed.

In the image decoding method of the present invention, the configuring of the reference sample may comprise selecting one reference sample line to be used for intra-prediction among multiple reference sample lines, the performing of the intra-prediction on the current block may comprise performing filtering on a prediction sample generated by the intra-prediction, and wherein whether or not to perform filtering on the prediction sample may be determined on the basis of at least one among the intra-prediction mode of the current block, a size of the current block, and the selected reference sample line.

In the image decoding method of the present invention, when the selected reference sample line is not a first reference sample line, the filtering on the prediction sample may not be performed.

An image encoding method according to another embodiment of the present invention may comprise determining an intra-prediction mode of a current block, configuring a reference sample of the current block, performing intra-prediction on the current block by using the intra-prediction mode of the current block and the reference sample, and encoding the intra prediction mode of the current block by using an intra-prediction mode of a neighbor block adjacent to the current block, wherein when the intra-prediction mode of the neighbor block is unavailable, the intra-prediction mode of the neighbor block may be replaced with a planar mode.

In the image encoding method of the present invention, the encoding of the intra-prediction mode of the current block may comprise deriving intra-prediction modes of multiple neighbor blocks adjacent to the current block, selecting a mode corresponding to a maximum value of an MPM candidate in an MPM list among the derived intra-prediction modes of the neighbor blocks, and configuring the MPM list including the mode corresponding to the maximum value.

In the image encoding method of the present invention, the encoding of the intra-prediction mode of the current block may comprise deriving intra-prediction modes of multiple neighbor blocks adjacent to the current block, selecting a mode corresponding to a maximum value of an MPM candidate in an MPM list and a mode corresponding to a minimum value of the MPM candidate in the MPM list among the derived intra-prediction modes of the neighbor blocks, and configuring the MPM list including the mode corresponding to the maximum value and the mode corresponding to the minimum value, wherein the MPM list may be configured to further include an additional mode derived by adding a predetermined offset to the mode corresponding to the maximum value or the mode corresponding to the minimum value.

In the image encoding method of the present invention, the deriving of the additional mode may be differently performed according to a difference value between the maximum value and the minimum value.

In the image encoding method of the present invention, the encoding of the intra-prediction mode of the current block may comprise deriving intra-prediction modes of multiple neighbor blocks adjacent to the current block, and configuring an MPM list on the basis of the derived intra-prediction modes of the neighbor block, wherein when all of the derived intra-prediction modes of the neighbor blocks are non-directional modes, the MPM list may be configured to include to a vertical mode, a horizontal mode, and a mode obtained by adding a predetermined offset to the vertical mode.

In the image encoding method of the present invention, the configuring of the reference sample may comprise selecting one reference sample line to be used for intra-prediction among multiple reference sample lines, and performing filtering on the reference sample, wherein whether or not to perform the filtering on the reference sample may be determined on the basis of at least one among the intra-prediction mode of the current block, a size of the current block, and the selected reference sample line.

In the image encoding method of the present invention, when the selected reference sample line is not a first reference sample line, the filtering on the reference sample may not be performed.

In the image encoding method of the present invention, when a number of samples included in the current block is smaller than 32, the filtering on the reference sample may not be performed.

In the image encoding method of the present invention, the configuring of the reference sample may comprise selecting one reference sample line to be used for intra-prediction among multiple reference sample lines, the performing of the intra-prediction on the current block may comprise performing filtering on a prediction sample generated by the intra-prediction, and wherein whether or not to perform filtering on the prediction sample may be determined on the basis of at least one among the intra-prediction mode of the current block, a size of the current block, and the selected reference sample line.

A computer-readable recording medium according to another embodiment of the present invention may be a non-transitory computer-readable recording medium storing a bitstream which is received, decoded and used to reconstruct an image by an image decoding apparatus, wherein the bitstream may comprise information on prediction of a current block, the information on prediction of the current block may be used to derive an intra-prediction mode of the current block by using an intra-prediction mode of a neighbor block adjacent to the current block, and used to configure a reference sample of the current block, the intra-prediction mode of the current block and the reference sample may be used for performing intra-prediction on the current block, and wherein when the intra-prediction mode of the neighbor block is unavailable, the intra-prediction mode of the neighbor block may be replaced with a planar mode.

A computer-readable recording medium according to another embodiment of the present invention may store a bitstream generated by an image encoding method and/or apparatus according to the present invention.

Advantageous Effects

According to the present invention, an image encoding/decoding method and apparatus with improved encoding/decoding efficiency may be provided.

Also, according to the present invention, an image encoding/decoding method and apparatus performing intra prediction with improved encoding/decoding efficiency may be provided.

Also, according to the present invention, a recording medium storing a bitstream generated by an image encoding method/apparatus of the present invention may be provided.

Also, according to the present invention, a recording medium storing a bitstream which is received, decoded and used by an image decoding apparatus according to the present invention to reconstruct an image may be provided.

MODE FOR INVENTION

Figure 1:
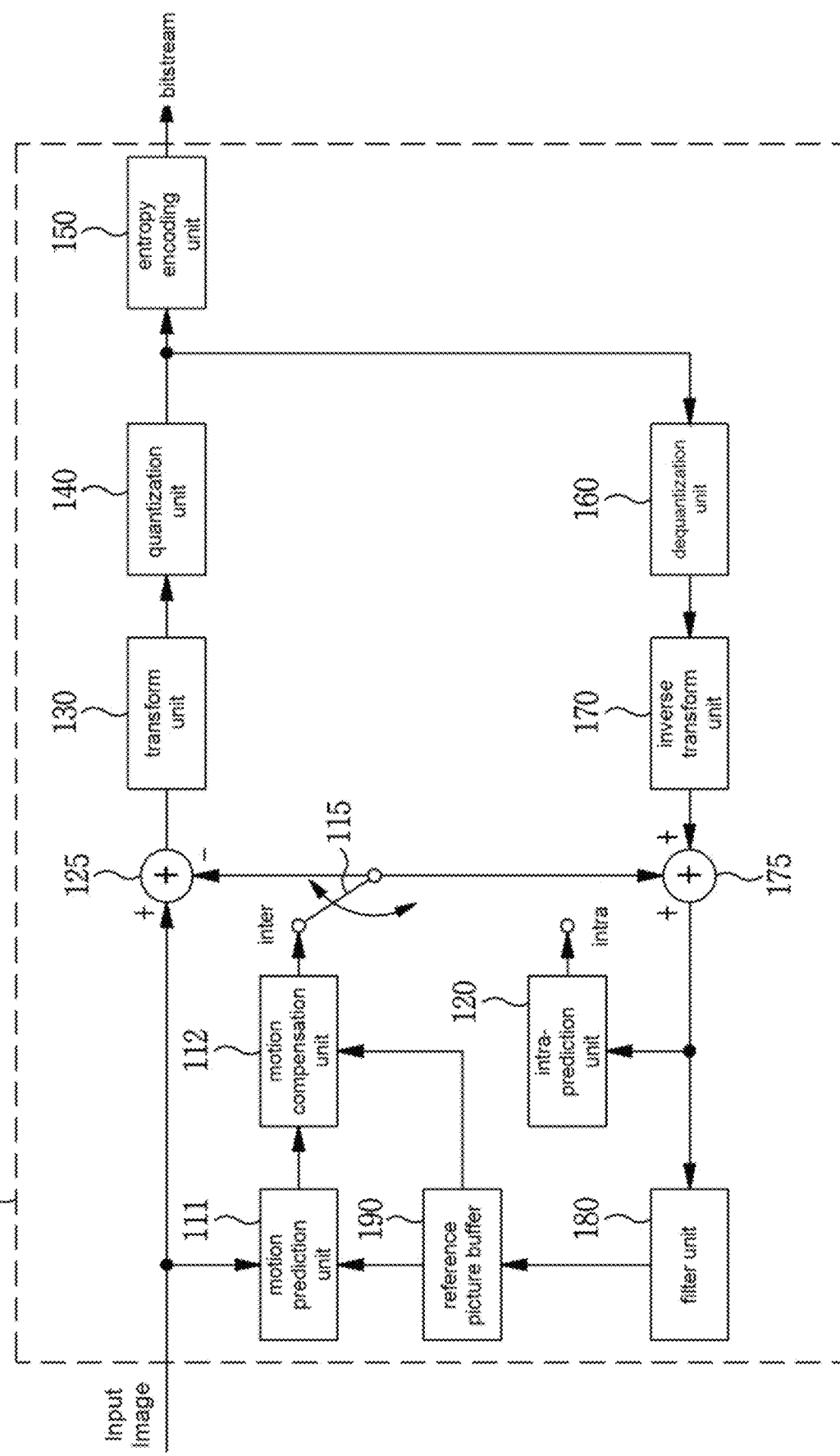
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other.

A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/ decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more bricks may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
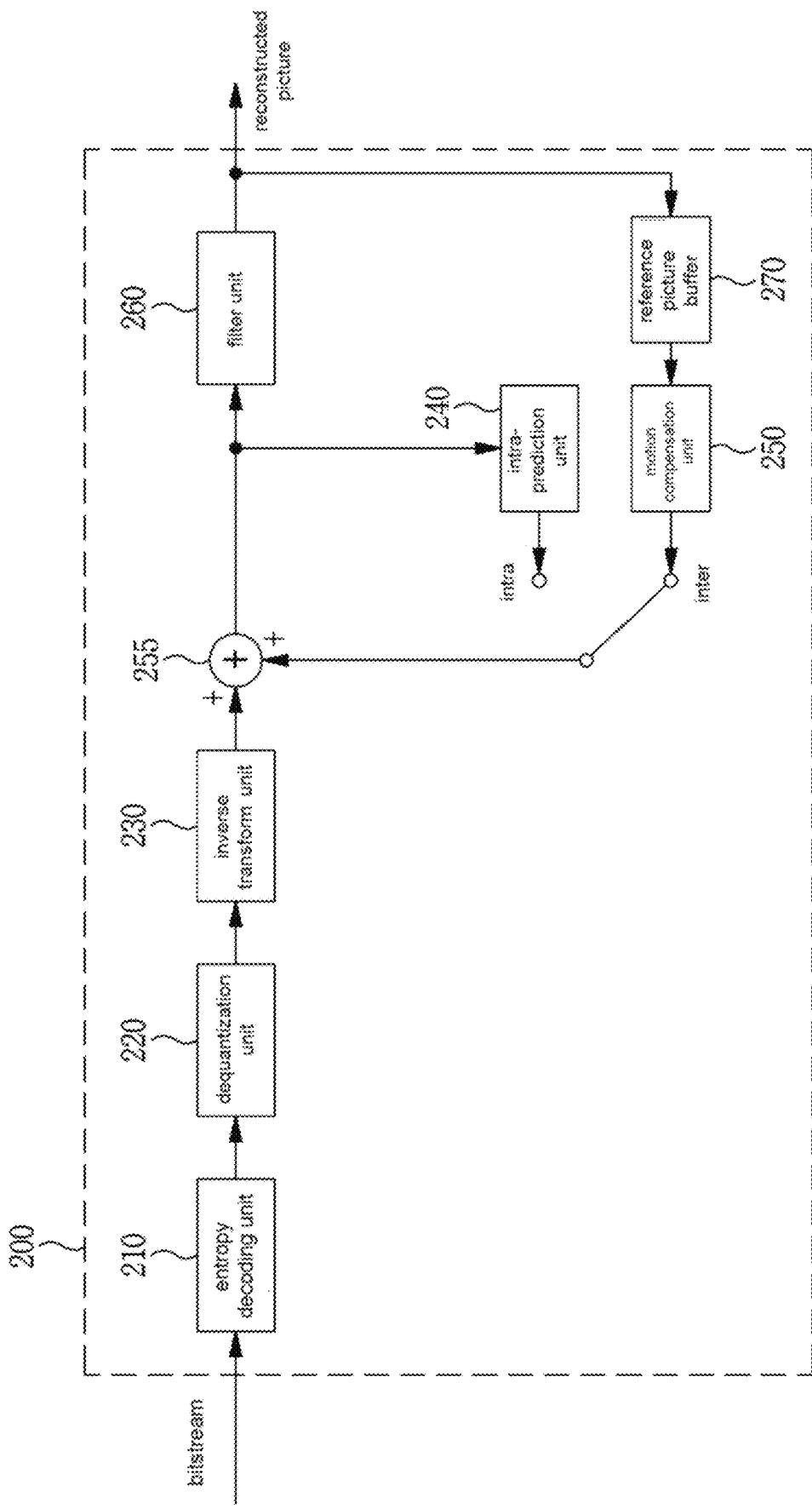
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
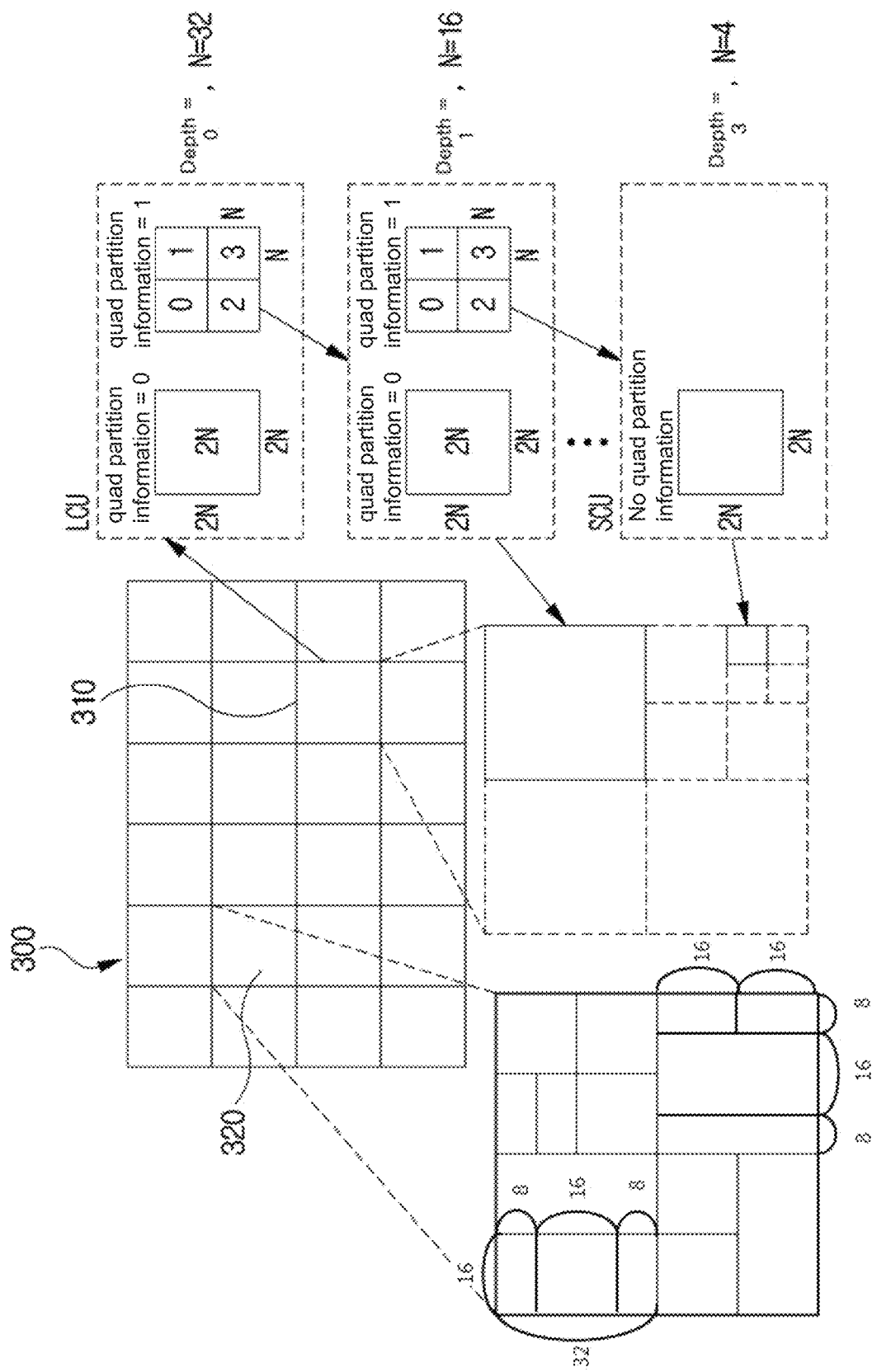
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra slice and an inter slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra slice, the maximum size of a ternary tree may be 32×32. For example, for an inter slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
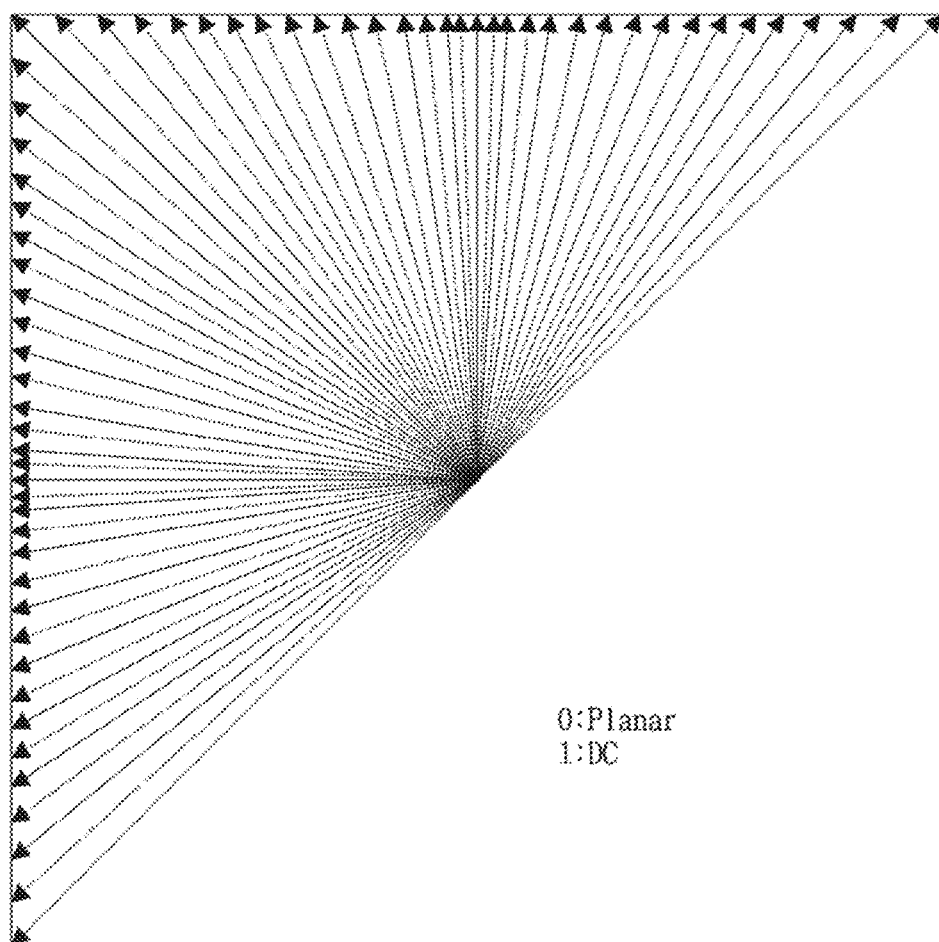
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
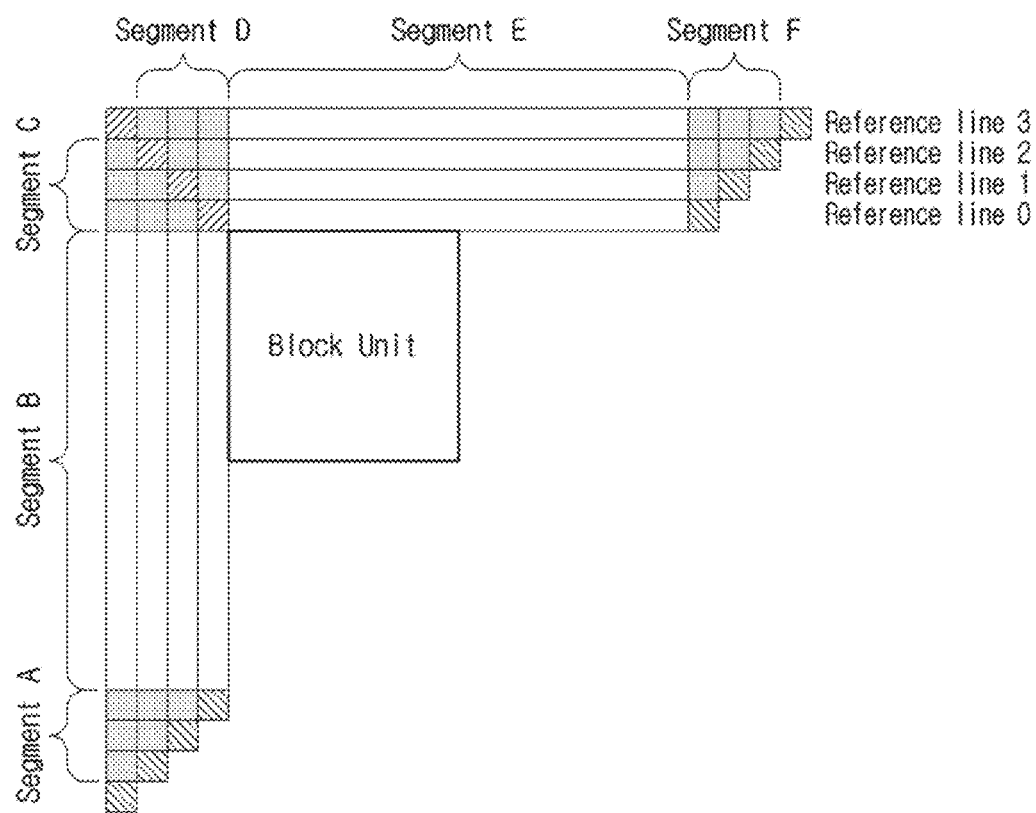
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
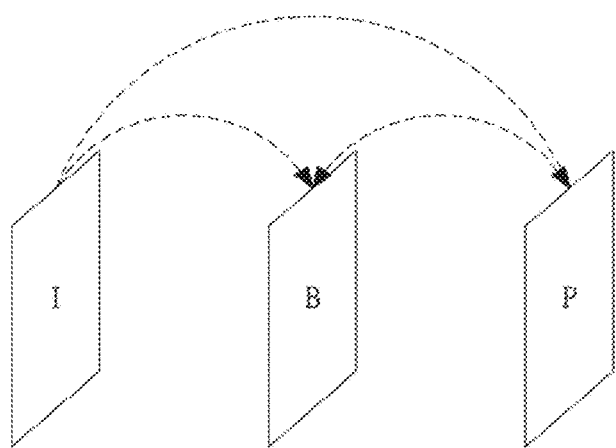
FIG. 5 is a diagram illustrating an embodiment of an inter prediction process.

FIG. 5 is a diagram illustrating an embodiment of an inter prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter prediction. The P picture may be encoded through inter prediction by using a reference picture that is present in one direction (i.e., forward direction or backward direction) with respect to a current block. The B picture may be encoded through inter prediction by using reference pictures that are preset in two directions (i.e., forward direction and backward direction) with respect to a current block. When the inter prediction is used, the encoder may perform inter prediction or motion compensation and the decoder may perform the corresponding motion compensation.

Hereinbelow, an embodiment of the inter prediction will be described in detail.

The inter prediction or motion compensation may be performed using a reference picture and motion information.

Motion information of a current block may be derived during inter prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
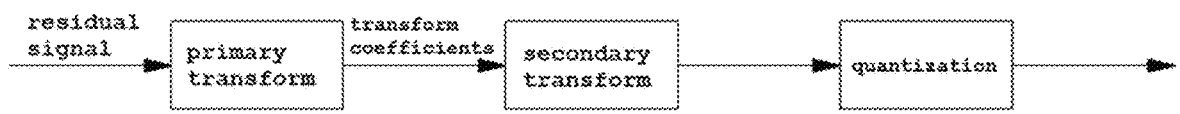
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Figure 8:
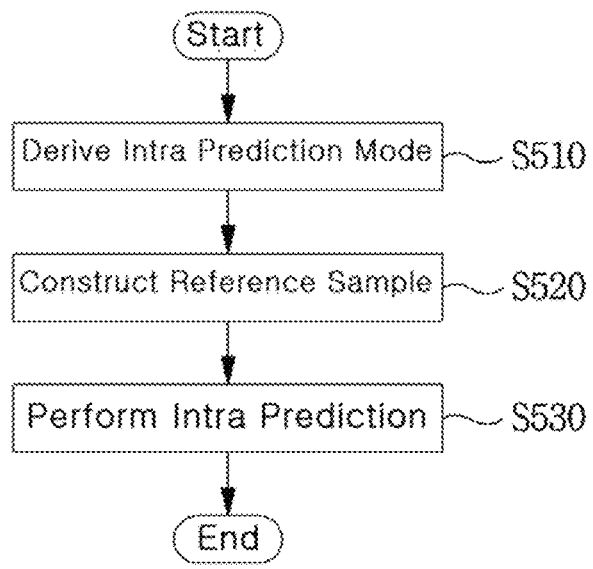
FIG. 8 is a view showing intra-prediction according to the present invention.

FIG. 8 is a view showing intra-prediction according to the present invention.

Intra-prediction of a current block may comprise step S510 of deriving an intra-prediction mode, step S520 of configuring a reference sample, and/or step S530 of performing intra-prediction.

In step S510, an intra-prediction mode of a current block may be derived. The intra-prediction mode of the current block may be derived by using a method of using an intra-prediction mode of a neighbor block, a method of entropy encoding/decoding an intra-prediction mode of a current block from a bitstream, a method of using a coding parameter of a neighbor block or a method of using intra prediction mode of a color component. Additionally, based on at least one among an intra prediction mode and a size/shape of the current block, the first directional mode may be changed to the second directional mode.

In step S520, a reference sample may be configured by performing at least one of reference sample selecting, reference sample padding and reference sample filtering.

In step S530, intra-prediction may be performed by performing at least one of non-angular prediction, angular prediction, positional information based prediction and inter color component prediction. Additionally, filtering on a prediction sample may be performed in the process of performing intra prediction. When performing the additional filtering, based on at least one among an intra prediction mode, sizes of width and height, a shape of a block and a position of a prediction sample, a filtering on at least one prediction sample inside the current block may be performed. In this case, at least one among a filter type, a filter coefficient, a filter tab and a filter shape may be different.

Hereinafter, deriving an intra prediction mode (S510) is described below in detail.

In order to derive the intra-prediction mode of the current block, at least one reconstructed neighbor block may be used. A position of the reconstructed neighbor block may be a fixed position that is predefined, or may be a position derived by encoding/decoding. Hereinafter, encoding/decoding may mean entropy encoding and decoding. For example, when a coordinate of a left upper corner side sample of a current block having a W×H size is (0, 0), a neighbor block may be at least one of blocks adjacent to coordinate of (−1, H−1), (W−1, −1), (W, −1), (−1, H), and (−1, −1), and neighbor blocks of the above blocks. Here, W and H may represent length or the number of samples of width (W) and height (H) of the current block.

An intra-prediction mode of a neighbor block which is not available may be replaced with a predetermined intra-prediction mode. The predetermined intra-prediction mode may be, for example, a DC mode, a planar mode, a vertical mode, a horizontal mode, and/or a diagonal mode. For example, when a neighbor block is positioned outside of a boundary of at least one predetermined unit of a picture, a slice, a tile group, a tile, and a coding tree unit, the neighbor block is inter-predicted, or when the neighbor block is encoded in a PCM mode, the corresponding block may be determined as non-available.

For example, when a neighbor block is an upper block, and when a CTU to which the neighbor block belongs is different from the CTU to which the current block belongs (that is, an upper boundary of the current block is an upper boundary of the current CTU), the neighbor block is determined as non-available. In this case, a Planar mode may be used instead of an intra prediction mode of the neighbor block (that is, a Planar mode may be derived as an intra prediction mode of the neighbor block). On the other hand, when the neighbor block is an inter predicted block and when an indicator (for example, inter_intra_flag) representing whether a combined prediction of an inter prediction and an intra prediction is performed or not is 1, the neighbor block may be determined as available.

The intra-prediction mode of the current block may be derived as an intra-prediction mode of a predetermined positional neighbor block or a statistical value of intra-prediction modes of at least two neighbor blocks. In the present description, the statistical value may mean at least one of an average value, a maximum value, a minimum value, a most frequent value, a median value, a weighted average value, and an interpolation value. For example, a mode corresponding to the maximum value of an intra prediction mode of a left block and an intra prediction mode of an upper block may be determined as a MPM candidate and may be derived as an intra prediction mode of the current block.

Alternatively, the intra-prediction mode of the current block may be derived based on a size of neighbor blocks. For example, an intra-prediction mode of a neighbor block having relatively large size may be derived as the intra-prediction mode of the current block. Alternatively, a statistical value may be calculated by assigning a large weight on an intra-prediction mode of a block having relatively large size. Alternatively, a mode to which a relatively large weight is assigned may be pre-defined or signaled. For example, a relatively large weight may be assigned to at least one among a vertical directional mode, a horizontal directional mode, a diagonal directional mode and non-directional mode. The same weight may be assigned to the above modes.

Alternatively, whether or not the intra-prediction mode of the neighbor block is angular mode may be considered. For example, when the intra-prediction mode of the neighbor block is a non-angular mode, the non-angular mode may be derived as the intra-prediction mode of the current block. Alternatively, an intra-prediction mode of other neighbor block, except for the non-angular mode, may be derived as the intra-prediction mode of the current block.

In order to derive the intra-prediction mode of the current block, it is possible to construct one or more most probable mode (MPM) lists. The MPM list includes one or more MPM candidate modes, and the MPM candidate mode may include an intra-prediction mode of at least one spatial neighboring block in which encoding/decoding is completed and/or a given intra-prediction mode.

An intra prediction mode of the current block may be derived by adding an offset of a specific K to a statistic value of MPM candidate modes included in an MPM list. In this case, K may mean at least one among a negative integer, 0 and a positive integer. For example, for an intra prediction mode of the current block, an MPM candidate mode generated by adding an offset of a specific K to a minimum value of MPM candidate modes included in an MPM list may be added to the MPM list. For example, for an intra prediction mode of the current block, an MPM candidate mode generated by adding an offset of a specific K to a maximum value of MPM candidate modes included in an MPM list may be added to the MPM list.

Alternatively, modes obtained by adding a predetermined offset to or subtracting a predetermined offset from each of the minimum value and the maximum value of directional candidate modes included in an MPM list may be added to the MPM list as MPM candidates. For example, a mode obtained by adding m to and/or subtracting m from the minimum value and a mode obtained by adding n to and/or subtracting n from the maximum value may be added to the MPM list. Here, m and n may be positive integers (for example, 1 or 2).

The same MPM candidate cannot be included in the MPM list in duplicate. Therefore, in order that a mode obtained by adding m to the minimum value is not identical a mode obtained by subtracting n from the maximum value, a configuration method of an MPM list may be applied differently based on a difference between the minimum value and the maximum value. For example, when the difference between the minimum value and the maximum value among candidate modes included in an MPM list is determined as 1, a mode obtained by adding 1 to the minimum value is duplicated with the maximum value, and a mode obtained by subtracting 1 from the maximum value is duplicated with the minimum value. Therefore, the duplicated modes may not be added to the MPM list. In this case, a mode obtained by subtracting 1 from the minimum value, a mode obtained by adding 1 to the maximum value and a third mode may be added to the MPM list. The third mode may be, for example, a mode obtained by subtracting 2 from the minimum value.

Figure 9:
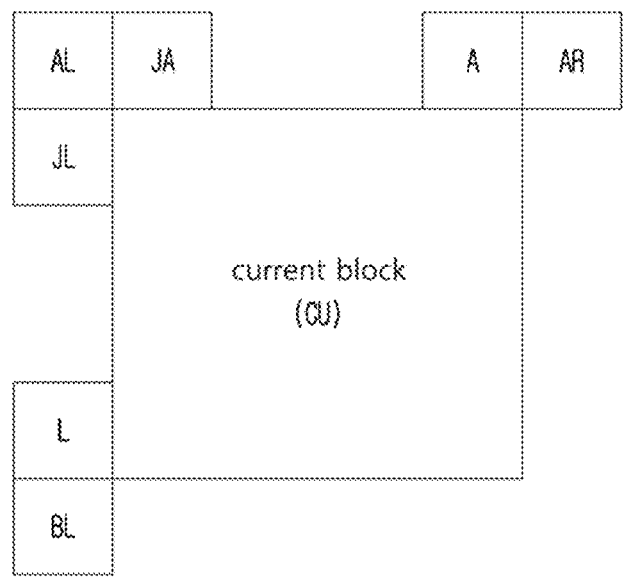
FIG. 9 is a diagram illustrating spatial neighboring blocks of a current block used when configuring an MPM list.

FIG. 9 is a diagram illustrating spatial neighboring blocks of a current block used when configuring an MPM list.

For example, assuming that the number of intra-prediction modes configuring the MPM list is six, as shown in FIG. 9, from at least one of the spatial neighboring blocks (AL, JA, A, AR, JL, L and BL) of the current block, the candidate modes to be included in the MPM list may be sequentially derived up to k at maximum (k is a positive integer). In the following description, for example, k is 5.

The order of deriving the MPM candidate mode from the neighboring blocks may be arbitrarily set by the encoder/decoder. For example, the MPM candidate modes may be derived in the order of a left block L, a top block A, a lower left block BL, an upper right block AR, and an upper left block AL. Further, the MPM candidate modes may be derived in the order of the left block L and the top block A. A Planar mode and/or a DC mode, which is a non-directional mode, may be regarded as an intra-prediction mode having a high probability of occurrence. Therefore, when the Planar mode and/or the DC mode are not included in the five intra-prediction modes derived from the spatial neighboring blocks, the Planar mode and/or DC mode may be included in the MPM list as the MPM candidate mode. That is, the Planar mode and/or DC modes may always be included in the MPM candidate list. Because a non-directional mode performs prediction using both an upper and left reference sample, the probability of occurrence may be high. Therefore, by adding DC mode and Planar mode always in an MPM list, a bit overhead for signaling an intra prediction mode may be decreased.

In case mrl_index below is not 0, a Planar mode and/or a DC mode may be included in an MPM candidate list. In addition, in case mrl_index below is 0, a Planar mode and/or a DC mode may not be included in an MPM candidate list.

Herein, the order in which the Planar mode and/or the DC mode are located in the MPM list may be arbitrarily set in the encoder/decoder. For example, the MPM list may be configured in the order of the left block L, the top block A, Planar mode, DC mode, the lower left block BL, the upper right block AR, and the upper left block AL. In addition, the MPM list may be configured in the order of the left block L, the top block A, Planar mode, and DC mode.

The redundancy check may be performed to determine whether the intra-prediction modes in the configured MPM list are prediction modes different from each other. In case the redundancy check is performed, intra prediction modes redundant each other may not exist in the MPM list. When the number of intra-prediction modes included in the MPM list after the redundancy check is smaller than the maximum number (for example, six) of intra-prediction modes that the MPM list may include, an intra-prediction mode in which a predetermined offset is added and/or subtracted to/from the intra-prediction mode having directionality among intra-prediction modes included in the MPM list may be additionally included in the MPM list. Herein, the offset value is not limited to one but may be an integer of two or more.

When the MPM list is not filled through the above process, for example, when the number of the MPM candidate modes is less than six, the MPM list is filled in the order of a vertical mode, a horizontal mode, and a diagonal mode, so that the MPM list may be configured with up to six intra-prediction modes at maximum different from each other. The order in which the default modes (vertical mode, horizontal mode, and diagonal mode) are filled is not limited to the above example and may be any sequence previously defined in the encoder/decoder. When the number of intra-prediction modes is 67 at maximum, mode 0 indicates a Planar mode, mode 1 indicates a DC mode, and modes 2 through 66 may indicate directional modes. In addition, the vertical mode may be mode 50, the horizontal mode may be mode 18, and the diagonal mode may be mode 2, mode 34, and/or mode 66.

For example, MPM candidates derived from neighboring blocks are all non-directional, as a default mode, a vertical mode and a horizontal mode may be added to an MPM list. Further, a mode obtained by adding a predetermined offset to and/or subtracting a predetermined offset from a directional mode added to the MPM list, may be added to the MPM list. The predetermined offset may be a positive integer, for example, one among 1, 2, 3 and 4. For example, two modes obtained by adding 4 to and/or subtracting 4 from a vertical mode may be added to the MPM list.

An indicator "prev_intra_luminance_pred_flag" indicating whether there is the same mode as the intra prediction mode of the current block within the derived MPM list is encoded/decoded.

When the indicator indicates that there is the same mode as the intra prediction mode of the current block within the MPM list, index information "mpm_idx" indicating which mode within the MPM list is the same as the intra prediction mode of the current block is encoded/decoded so that the intra prediction mode of the current block can be derived.

When the indicator indicates that there is no mode the same as the intra prediction mode of the current block, the intra prediction mode of the current block is encoded/decoded so that the intra prediction mode of the current block can be derived. In this case, at least one of the intra prediction modes that are not listed in the MPM list are sorted in ascending or descending order.

When the indicator indicates that there is no mode the same as the intra prediction mode of the current block within the MPM list, a secondary MPM list including one or more intra prediction modes is constructed. In this case, the intra prediction mode of the current block is derived by using index information "2nd_mpm_idx" indicating which mode within the secondary MPM list is the same as the intra prediction mode of the current block.

When the indicator indicates that there is no mode the same as the intra prediction mode of the current block within the MPM list and/or the secondary MPM list, the intra prediction mode of the current block is encoded/decoded by using a remaining intra prediction mode index "rem_intra_luminance_pred_mode".

An intra prediction mode of a chrominance component is acquired by using at least one of an intra prediction mode index "intra_chroma_pred_mode" of the chrominance component and an intra prediction mode of the corresponding luminance component.

According to a further embodiment of the present invention relating to a method of deriving an intra prediction mode, an intra prediction mode of a current block may be derived by using an intra prediction mode of a different color component. For example, when the current block is a chroma block (Cb block or Cr block), an intra prediction mode of a luma block corresponding to the chroma block can be used to derive an intra prediction mode of the chroma block. As the luma block corresponding to the chroma block, there may be one or more luma blocks. The corresponding luma block may be determined depending on at least any one of a position of the luma block, a position of the chroma block, an upper-left sample position of the luma block, an upper-left sample position of the chroma block, the size of the luma block, the size, the shape, and the encoding parameter of the chroma block. Alternatively, the corresponding luma block may be determined depending on at least any one of the size, the shape, and the encoding parameter of a luma block.

The luma block corresponding to the chroma block may be composed of a plurality of blocks. All or part of the plurality of blocks may have different intra prediction modes thereof. An intra prediction mode of the chroma block may be derived on the basis of all or part of the plurality of blocks included in the corresponding luma block. In this case, some blocks may be selectively used, in which the used blocks are selected based on the comparison of the block size, the shape, the depth information, etc. of the chroma block with those of the luma block (all or part of the plurality of blocks). A block at a position in the luma block corresponding to a predetermined position in the chroma block may be selectively used. The predetermined position may refer to a corner sample (e.g., upper left sample) position in the chroma block or a center sample position in the chroma block. The center sample position may be determined based on an upper-left position of a luma/chroma block, half horizontal size of a luma/chroma block, half vertical size a luma/chroma block. For example, position of x-axis direction of the center sample may be determined by adding half horizontal size of a luma/chroma block to an upper-left position of the luma/chroma block in horizontal direction. Also, position of y-axis direction of the center sample may be determined by adding half vertical size of a luma/chroma block to an upper-left position of the luma/chroma block in vertical direction. Here, position of a luma block corresponding to a center sample position of the chroma block may mean a center sample position of the luma block.

The method of deriving an intra prediction mode of one color component block using an intra prediction mode of a different color component block (i.e. inter color component intra prediction mode) according to the present invention is not limited to the example in which an intra prediction mode of a luma block corresponding to a chroma block is used. For example, an intra prediction mode of a chroma block may be derived by using or sharing at least any one of an MPM index mpm_idx and an MPM list of a luma block corresponding to the chroma block.

Figure 10:
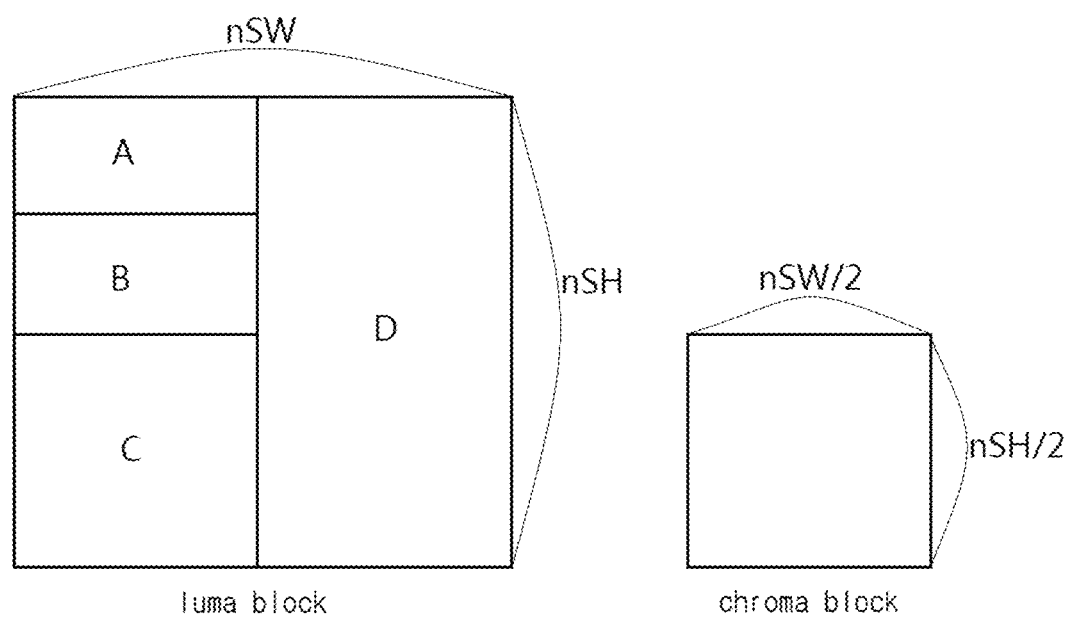
FIG. 10 is an exemplary diagram illustrating the relationship between a luma block and a chroma block.

FIG. 10 is an exemplary diagram illustrating the relationship between a luma block and a chroma block.

In the example illustrated in FIG. 10, a sample ratio of color components is 4:2:0, and at least one of luma blocks A, B, C, and D corresponds to one chroma block.

With reference to FIG. 10, an intra prediction mode of one chroma block may be derived by using an intra prediction mode of A of (0,0) position inside the luma block corresponding to a sample at an upper left position in the chroma block, an intra prediction mode of D of (nSW/2, nSH/2) position inside the luma block corresponding to a sample at a center position in the chroma block, or an intra prediction mode of B of ((nSW/2)−1, (nSH/2)−1) position inside the luma block corresponding to a sample at another center position in the chroma block. The predetermined position in the luma block is not limited to (0, 0), ((nSW/2)−1, (nSH/2)−1) and (nSW/2, nSH/2). For example, The predetermined position may be an upper right position, a lower left position, and/or a lower right position inside a luma block. the nSW may mean a size of width of a luma block and the nSH may mean a size of height of a luma block.

That is, an intra prediction mode of a top-left sample within a particular chrominance block is derived from an intra prediction mode of at least one sample located at a specific position within the corresponding luminance block, in which the specific position is a top left position (0, 0), a central position (nSW/2, nSH/2), a position ((nSW/2)−1, (nSH/2)−1), a top right corner position, a bottom left corner position, or a bottom right corner position when the top left position of the luminance block is a reference position. For example, an intra prediction mode of a top-left sample position within a particular chrominance block is derived as an intra prediction mode of a luminance block at a central sample position (nSW/2, nSH/2) when a top-left position of a corresponding luminance block is a reference position.

The positions within the chrominance block and the positions within the luminance block are calculated according to the distance from the top-left position of each block. For instance, the central sample position of the luminance block is calculated by adding the coordinate values (nSW/2, nSH/2) to the coordinate values (0, 0) of the top-left sample position of the luminance block.

The predetermined position may be selected on the basis of the shape of the luma block or the shape of the chroma block. For example, with the chroma block having a square shape, the predetermined position may be a center sample position. With the chroma block having an oblong shape, the predetermined position may be an upper left sample position. Alternatively, the predetermined position may be a position of an upper left sample in the chroma block having a square shape or a position of a center sample in the chroma block having an oblong shape.

According to another embodiment, an intra prediction mode of a chroma block may be derived by using statistic values of one or more intra prediction modes inside a luma block having a size corresponding to a size of the chroma block.

In the example illustrated in FIG. 10, a mode corresponding to one among statistic values of the intra prediction modes of the luma blocks A and D or a mode corresponding to one among statistic values of the intra prediction modes of the luma blocks A, B, C, and D inside a luminance block having a size corresponding to a size of the chroma block is derived as the intra prediction mode of the chroma block.

When there are multiple intra prediction modes of available luma blocks, all or part of them may be selected. The selection is performed based on the predetermined position in the luma block or the chroma block or based on the size(s), the shape(s), and/or the depth(s) of the chroma block, the luma block, or both. The intra prediction mode of the chroma block can be derived by using the selected intra prediction mode of the luma block.

For example, the size of A of (0, 0) position inside the luma block corresponding to the upper left sample position in the chroma block and the size of the luminance bock D corresponding to the center sample position (nSW/2, nSH/2) in the chroma block are compared, and the intra prediction mode of the luma block D having a larger size may be used to derive the intra prediction mode of the chroma block.

Alternatively, when the size of a luma block corresponding to a predetermined position in a chroma block is equal to or larger than the size of the chroma block, an intra prediction mode of the chroma block is derived by using the intra prediction module of the luma block.

Alternatively, when the size of a chroma block is within a predetermined range, an intra prediction mode of the chroma block is derived by using an intra prediction mode of a luma block corresponding to the upper left sample position (0, 0) in the chroma block.

Alternatively, when the size of a chroma block is within a predetermined range, sizes of luma blocks existing at predetermined positions (0, 0), ((nSW/2)−1, (nSH/2)−1), (nSW/2, nSH/2) inside a luma block corresponding to predetermined positions inside a chroma block are compared, and an intra prediction mode of the chroma block is derived by using the intra prediction mode of the luma block having a larger size.

The predetermined range may be derived from at least any one piece of information among information signaled through a bitstream, information of the size (and/or depth) of a block (a chroma block, a luma block, or both), and information predefined in an encoder/decoder.

Alternatively, when a chroma block has an oblong shape, an intra prediction mode of the chroma block may be derived by using an intra prediction mode of a center sample position (nSW/2, nSH/2) inside a luma block corresponding to a center sample position inside a chroma block or an intra prediction mode of another center sample position ((nSW/2)−1, (nSH/2)−1) inside a luma block corresponding to another center sample position in a chroma block.

Among the plurality of blocks of the luma block, a block having the same shape as the chroma block may be used. For example, when the chroma block has a square shape or a non-square shape, a block having a square shape or a non-square shape, selected among the plurality of blocks of the luma block, may be used.

In the example described with reference to FIG. 10, the method of deriving an intra prediction mode of a chroma block using an intra prediction mode of a luma block also applies to a case in which an intra prediction mode of a luma block is used as an intra prediction mode of a chroma block as it is. The method of deriving an intra prediction mode of a chroma block is not limited to the method of using an intra prediction mode of the corresponding luma block. For example, an intra prediction mode of a chroma block can be derived from information, including an MPM list and an MPM index mpm_idx, which is used to derive an intra prediction mode of a luma block.

Alternatively, the MPM list of the chroma block can be constructed using the intra prediction mode of the luma block corresponding to the sample of the predetermined position in the chroma block. In this case, the mpm-idx information of the chroma block may be encoded and signaled. The MPM list of the chroma block may be constructed in a similar way to the construction of the MPM list of the luma block. MPM candidates of the chroma block may include intra prediction modes of neighbor chroma blocks and/or intra prediction modes of luma blocks corresponding to the chroma block.

When an MPM flag is 0, a second MPM list including at least one intra-prediction mode may be configured, and the intra-prediction mode of the current block may be derived by using a second MPM index (2nd_mpm_idx). Herein, a second indicator (for example, a second MPM flag) indicating whether or not the intra-prediction mode of the current block is included in the second MPM list may be encoded/decoded. Similar to a first MPM list, the second MPM list may be configured by using intra-prediction modes of the neighbor block. Herein, the intra-prediction mode included in the first MPM list may not be included in the second MPM list. A number of MPM lists is not limited to 1 or 2, N MPM lists may be used.

When the intra-prediction mode of the current block is not included in one of a plurality of MPM lists, a luma component intra-prediction mode of the current block may be encoded/decoded. In addition, a chroma component intra-prediction mode may be derived and encoded/decoded based on an associated luma component intra-prediction mode.

Further alternatively, for example, the prediction coding efficiency of the intra prediction mode of the chrominance block is improved by placing a higher priority on a luminance block position corresponding to the central sample position of the chrominance block when deriving the intra prediction mode of the chrominance block from the intra prediction mode of the corresponding luminance block.

Figure 11:
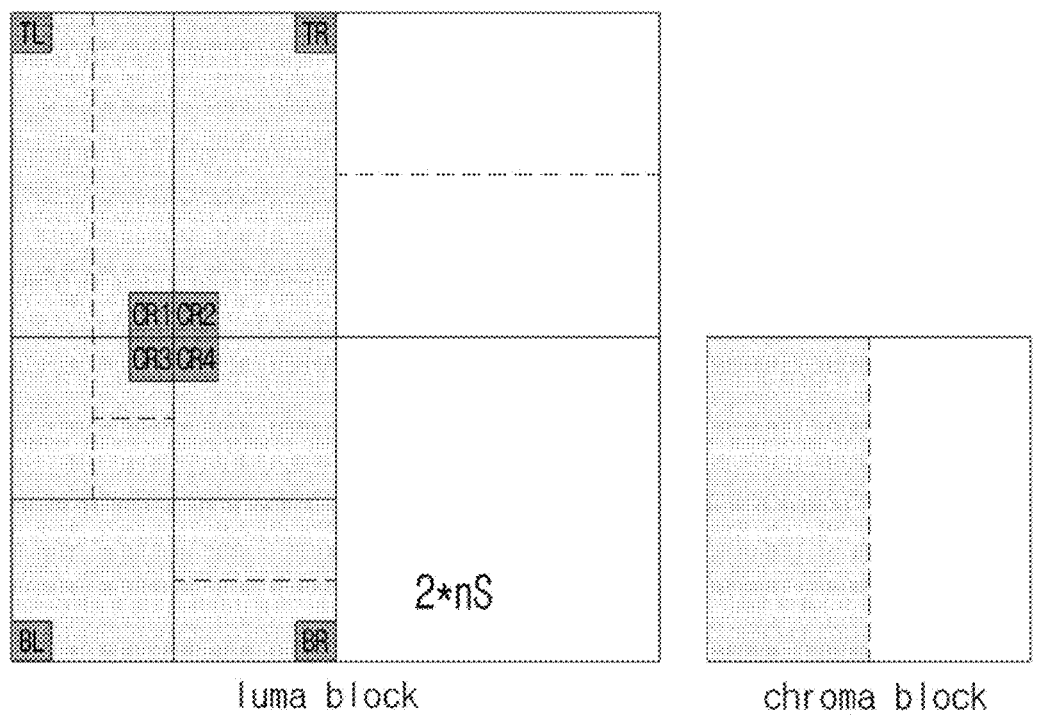
FIG. 11 is a diagram illustrating an exemplary method of deriving an intra prediction mode of a chrominance block from the corresponding luminance block.

FIG. 11 is a diagram illustrating an exemplary method of deriving an intra prediction mode of a chrominance block from the corresponding luminance block.

In the example illustrated in FIG. 11, a color component ratio is 4:2:0, and a luminance block corresponding to a chrominance block is located at least one of the following positions: CR1, CR2, CR3, CR4, top-left (TL), top-right (TR), bottom-left (BL), and bottom-right (BR).

At least one of the intra prediction modes of the sample positions CR1, CR2, CR3, CR4, TL, TR, BL, and BR in the corresponding luminance block is used to derive the intra prediction mode of the chrominance block.

The intra prediction mode of the chrominance block is derived from available intra prediction modes of the sample positions CR1, CR2, CR3, CR4, TL, TR, BL, and BR in this order. However, the order is not limited to the above order. The order is determined depending on the size or shape of the chrominance block.

When the intra prediction mode of the chrominance block is derived from the intra prediction mode of the corresponding luminance block, at least one of the coding parameters of the chrominance block and the luminance block is used.

The MPM list of the chrominance block is composed of at least one of the intra prediction modes described below. Alternatively, the intra prediction modes that can be used in the chrominance block include at least one of the intra prediction modes listed below. Here, the MPM list of chrominance blocks is constructed such that the candidate modes in the MPM list do not overlap each other. The candidate modes include:
  intra prediction modes of spatial neighboring blocks (at least one of the left, top, bottom left, top right, and top left blocks) adjacent to the chrominance block;
  at least one of Planar mode and DC mode;
  at least one of the intra prediction modes of the sample positions CR1, CR2, CR3, CR4, TL, TR, BL, and BR within the luminance block corresponding to the chrominance block; and
  at least one of the vertical, horizontal, and diagonal modes.

When the current block is partitioned into a plurality of sub-blocks, in order to derive an intra-prediction mode of each sub-block, at least one of the described methods may be applied.

A size or form or both of a sub-block may be a predetermined size or block or both (for example, 4×4), or may be determined according to a size or form or both of the current block. Alternatively, the size of the sub-block may be determined based on whether or not a neighbor block of the current block is partitioned, or may be determined based on an intra-prediction mode of a neighbor block of the current block. For example, the current block may be partitioned based on a boundary at which an intra-prediction mode of a neighbor block is different. Alternatively, the current block may be partitioned based on whether the neighbor block is an intra coding block or an inter coding block.

An indicator (for example, NDIP_flag) representing that the intra-prediction mode of the current block is derived by using the intra-prediction mode of the neighbor block may be encoded/decoded. The indicator may be encoded/decoded by at least one unit of the current block and the sub-block. Herein, when a size of the current block or the sub-block corresponds to a predetermined size or a predetermined size range, the indicator may be encoded/decoded.

Determining whether or not the size of the current block corresponds to a predetermined size may be performed based on a horizontal or vertical length of the current block. For example, when the horizontal or vertical length is a length capable of being partitioned, it is determined that the size of the current block corresponds to a predetermined size.

When the intra prediction mode is derived, information on intra prediction is entropy-encoded encoded into or entropy-decoded from a bitstream. For example, the information on intra prediction includes at least one among the following elements:
  an indicator indicating whether there is an intra prediction mode identical to the intra prediction mode of the current block, within the MPM list "prev_intra_luma_pred_flag";
  index information indicating which mode among the modes included in the MPM list is identical to the intra prediction mode of the current block "mpm_idx";
  index information indicating which mode among the modes included in the secondary MPM list is identical to the intra prediction mode of the current block "2nd_mpm_idx";

remaining intra prediction mode indices "rem_intra_luma_pred_mode"; and chrominance intra prediction mode indices "intra_chroma_pred_mode".

There may be a case where at least one piece of the information on the intra prediction will not signaled, depending on at least one of a block size and a block shape. The information that is not signaled is derived from a predetermined value, or is acquired from information on a previously processed block or a higher-level block.

For example, when the current block has a predetermined size, at least one piece of the information on the intra prediction of the current block is not signaled, instead, at least one piece of the information on the intra prediction of a block having a size identical to a previously encoded/decoded upper-level block may be used.

When at least one piece of the information on the intra prediction is entropy-encoded/entropy-decoded, at least one of the following binarization methods is used:

a truncated Rice binarization method;

a K-th order Exp_Golomb binarization method;

a limited K-th order Exp_Golomb binarization method;

a fixed-length binarization method;

a unary binarization method; and a truncated unary binarization method.

The Intra-prediction information may be signaled through at least one of a video parameter set (VPS), a sequence parameter set (SPS), a picture parameter set (PPS), an adaptation parameter set (APS), a slice header, a tile group header, a tile header, a coding unit, a prediction unit, a transform unit, a block, a coding block, a prediction block and a transform block. In a predetermined block size or less, at least one piece of intra-prediction information may not be signaled. Herein, intra-prediction information of a previously encoded/decoded block (for example, higher level block) may be used.

When deriving an intra-prediction mode according to an embodiment of the present invention, a mode may be changed from at least one intra-prediction mode of a current block and a neighbor block to a predetermined mode. Herein, changing to the predetermined mode may be performed on the basis of at least one of an intra-prediction mode, and a width and a height of a block. For example, changing to the predetermined mode may mean changing a mode from a first mode to a second mode.

Figure 12:
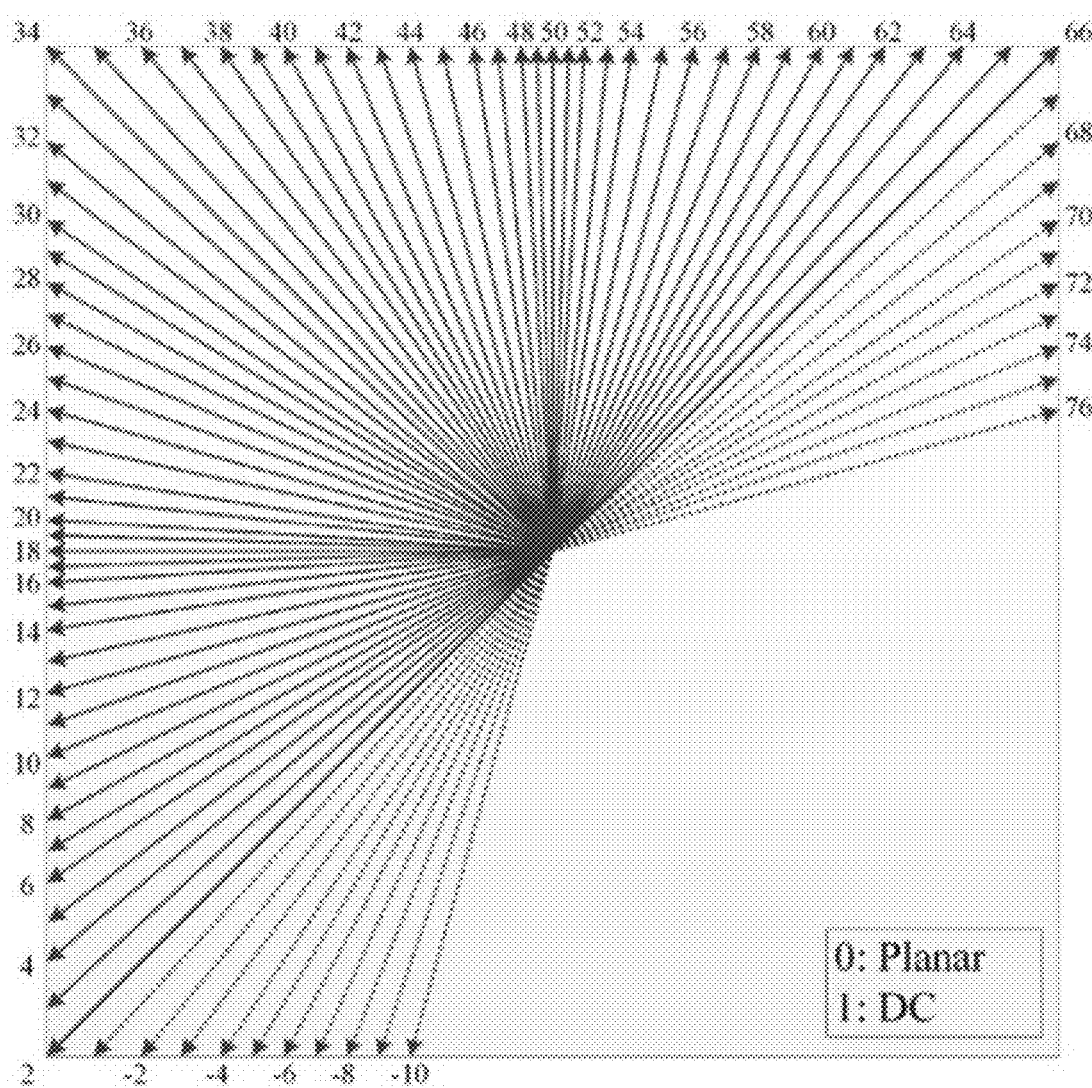
FIG. 12 is a view showing performing changing for an intra-prediction mode.

FIG. 12 is a view showing performing changing for an intra-prediction mode.

The first mode may be a signaled intra-prediction mode. For example, in FIG. 12, at least one of a mode 2 to a mode 66 represented in solid lines may be the first mode.

The second mode may be an intra-prediction mode that is not signaled. For example, in FIG. 12, at least one of a mode −1 to a mode −10, and a mode 67 to a mode 76 may be the second mode. The second mode may be a directional mode.

For example, a mode may be changed to from a first mode to a second mode by adding or subtracting a predetermined offset to or from the first mode.

When a first mode has a predetermined direction or corresponds to a predetermined range, the mode may be changed from the first mode to a second mode. The second mode may be a mode representing the predetermined direction or predetermined range. For example, when the first mode is a mode having a vertical direction (for example, being greater than a mode 34), the second mode may be a vertical mode (for example, mode 50). Similarly, when the first mode is a mode having a horizontal direction (for example, being equal to or smaller than a mode 34), the second mode may be a horizontal mode (for example, mode 18).

When a width and a height of a block are different from each other, a mode may be changed from a first mode to a second mode by comparing the width and the height.

For example, when a width of a block is greater than a height, a mode may be changed to a predetermined mode having a horizontal direction. For example, when a width is twice a height, a mode may be changed from the first mode corresponding to a mode 2 to a mode 7 to a second mode by adding an offset value of 65 to the first mode. Alternatively, when a width is four times a height, a mode may be changed from a first mode corresponding to a mode 2 to a mode 11 to a second mode by adding an offset value of 65 to the first mode.

For example, when a height of a block is greater than a width, a mode may be changed to a predetermined mode having a vertical direction. For example, when a height is twice a width, a mode may be changed from a first mode corresponding to a mode 61 to a mode 66 to a second mode by subtracting an offset value of 67 from the first mode. Alternatively, when a height is four times a width, a mode may be changed from a first mode corresponding to a mode 57 to a mode 66 to a second mode by subtracting an offset value of 67 from the first mode.

An intra-prediction mode of a current block or neighbor block may be stored as a first mode, or may be encoded/decoded. Alternatively, an intra-prediction mode of the current block or neighbor block may be stored as a first mode or second mode, and the mode may be changed from the stored intra-prediction mode to the first mode when performing encoding/decoding.

When deriving an MPM candidate, when an intra-prediction mode of a neighbor block is an intra-prediction mode that is not allowed for a current block, a mode may be changed from the intra-prediction mode of the neighbor block to a predetermined mode.

Figure 13:
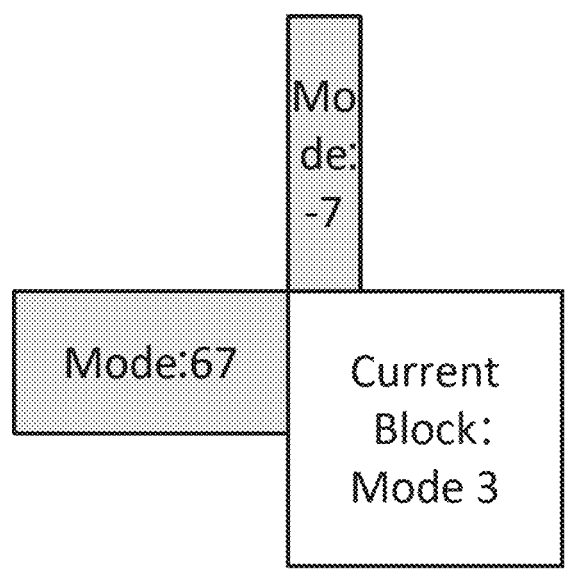
FIG. 13 is a view showing a method of deriving an MPM candidate from a neighbor block according to an embodiment of the present invention.

FIG. 13 is a view showing a method of deriving an MPM candidate from a neighbor block according to an embodiment of the present invention.

In FIG. 13, a width and a height of a current block may be identical. Herein, a mode allowed to the current block may be at least one of a mode 0 to a mode 66. For example, a mode 3.

In FIG. 13, a width of a left neighbor block may be twice a height. Herein, a mode allowed to the left neighbor block may be at least one of modes 0 and 1, and a mode 8 to a mode 72. For example, a mode 67.

In FIG. 13, a height of an upper neighbor block may be four times a width. Herein, a mode allowed to the upper neighbor block may be at least one of modes 0 and 1, and a mode −10 to a mode 56. For example, a mode −7.

When deriving an MPM candidate of a current block, and intra-prediction mode of at least one neighbor block may be used. In an example of FIG. 13, a mode 67 of a left neighbor block is a mode that is not allowed to a current block. Accordingly, a mode may be changed from the mode of the left neighbor block by applying a predetermined offset to the mode of the left neighbor block.

For example, in an example of FIG. 13, a width of a left neighbor block is twice a height. Accordingly, a mode 67 of the left neighbor block is a second mode obtained by adding an offset of 65 to a first mode. Conversely, the first mode may be obtained by subtracting an offset of 65 from the mode 67 that is the second mode. In other word, the first mode of the left neighbor block is a mode 2.

Similarly, in an example of FIG. 13, a height of an upper neighbor block is four times a width. Accordingly, a mode −7 of the upper neighbor block is a second mode obtained by subtracting an offset of 67 from a first mode. Conversely, the first mode may be obtained by adding an offset of 67 to the mode −7 that is the second mode. In other words, the first mode of the upper neighbor block is a mode 60.

A mode 2 that is a first mode of the left neighbor block and a mode 60 that is a first mode of the upper neighbor block may become an MPM candidate of a current block. Meanwhile, when deriving a remaining mode, the first mode obtained by changing the mode and an MPM candidate mode may be excluded from modes 0 to 66 which are targets to be signaled.

A mode may be changed during at least one of encoding/decoding an intra-prediction mode, deriving an MPM, reference sample filtering, directional prediction, and prediction sample filtering. Herein, the resulting mode may be applied to the above steps.

A mode may be changed when deriving an intra-prediction mode of a chroma block. For example, when deriving a DM mode of a chroma block, a mode may be changed from a mode of a luma block to a first mode or second mode, and then a DM mode of the chroma block may be derived.

An intra-prediction mode of a current block may be encoded/decoded by using an MPM list. mpm_flag representing whether or not an intra-prediction mode of a current block is present in the MPM list may be signaled. When mpm_flag is 1, index information of mpm_idx representing a mode identical to an intra-prediction mode of a current block among candidate modes within the MPM list may be signaled. In addition, when mpm_flag is 0, mpm_remainder representing an intra-prediction mode of a current block may be signaled.

At least one of methods of deriving an MPM mode and signaling an intra-prediction mode may be differently performed according to a reference sample line index (for example, mrl_index), or whether or not inter-prediction and intra-prediction are combined (for example, inter_intra_flag). The reference sample line index may be an index indicating a selected reference sample line where, for example, in an example of FIG. 7, at least one of Reference line 0 to Reference line 3 is selected when selecting one reference sample line from a plurality of reference sample line for intra-prediction of the current block.

For example, when mrl_index is not 0 (that is, when Reference line 0 is not selected in FIG. 7), an MPM list may be configured not to include a non-directional mode. For example, the MPM list having six MPM candidate modes may be reconfigured with four MPM candidate modes by excluding a DC mode and a planar mode from the MPM list. In other words, among MPM indices of 0, 1, 2, 3, 4, and 5, when 2 and 4 correspond to DC and planar modes, the MPM list may be reconfigured by modifying indices of 0, 1, 3, and 5 of the mode to indices of 0, 1, 2, and 3, respectively. Methods of deriving an MPM list having the six MPM candidate modes may be identical regardless of information of mrl_index.

For example, when mrl_index is not 0, at least one of mpm_flag and mpm_remainder may not be signaled. In other words, an intra-prediction mode of a current block may be derived on the basis of signaled mpm_idx. Alternatively, mrl_mpm_idx that is used when mrl_index is not 0 may be separately signaled. The mpm_idx or mrl_mpm_idx may be information on an MPM list configured by excluding the non-directional mode. For example, the mpm_idx or mrl_mpm_idx may be index information indicating a mode identical to an intra-prediction mode of a current block among four MPM candidate modes.

For example, when inter_intra_flag is 1, an MPM list may be configured by using a predetermined intra-prediction mode. The predetermined intra-prediction mode may be at least one of DC, planar, horizontal, and vertical modes.

For example, when inter_intra_flag is 1, at least one of mpm_flag and mpm_remainder may not be signaled. In other words, an intra-prediction mode of a current block may be derived on the basis of signaled mpm_idx. Alternatively, when mpm_flag is 1, an intra-prediction mode of a current block may be derived by signaling the mpm_idx, and when mpm_flag is 0, a predetermined intra-prediction mode may be derived as an intra-prediction mode of a current block. For example, when an MPM list includes three modes, three modes among DC, planar, horizontal and vertical modes may be included in the MPM list. Herein, when mpm_flag is 0, one mode that is not included in the MPM list may be derived as an intra-prediction mode of a current block.

Hereinbelow, the configuring a reference sample is described in detail.

A reference sample for intra-prediction may be configured based on the derived intra-prediction mode. In the description hereinafter, a current block may mean a prediction block or a sub-block having a size/form smaller than a size/form of the prediction block. The reference sample may be configured by using at least one sample reconstructed adjacent to a current block or by using a combination of samples. In addition, filtering may be applied to the configured reference sample.

A number or position or both of reconstructed sample lines used for configuring the reference sample may vary according to a position of a current block within a coding tree block. Each reconstructed sample on a plurality of reconstructed sample lines may be used as a reference sample at it is. Alternatively, a predetermined filter may be applied to the reconstructed sample, and a reference sample may be generated by using the filtered reconstructed sample. Reconstructed samples to which a filter is applied may be included in the same reconstructed sample line or in different reconstructed sample lines. Here, a plurality of reference sample lines consecutive along X-axis direction or Y-axis direction may be used for intra prediction of the current block, and a plurality of reference samples lines obtained by excluding at least one reference sample line among a plurality of consecutive reference sample lines may be used for intra prediction of the current block. The reference sample line may mean a reconstructed sample line.

An indicator indicating whether multiple reference sample lines are utilized for prediction may be signaled. For example, an indicator such as mrl_enabled_flag may be included in at least one of an SPS, a PPS, a tile header, a tile group header, and a slice header so as to be signaled. The flag may be an indicator indicating whether a single reference sample line is used or multiple reference sample lines are used.

When the indicator indicates that multiple reference sample lines are used, reference sample line indexes are also signaled. For example, mrl_index is signaled. Therefore, it is possible to determine which reference sample lines are used.

When the indicator mrl_index has a value of 0, a first reference sample line which is closest to the current block is utilized. On the other hand, when the indicator mrl_index has a value of 1, a second reference sample line which is second closest to the current block is utilized. When the indicator mrl_index has a value of 2, a third closest reference sample line which is third closest to the current block is used. The first to fourth reference sample lines respectively correspond to reconstructed sample lines 1 to 4 illustrated in FIG. 7, respectively. The mrl_index may indicate which reference sample line is constructed for intra prediction of the current block among a plurality of reference sample lines remained by excluding at least one reference sample line among a plurality of consecutive reference sample lines. That is, the plurality of reference sample lines to be indicated by mrl_index may be reference samples lines which are not consecutive each other. The plurality of reference sample lines to be consecutive may mean a plurality of reference sample lines are adjacent each other along X-axis direction or Y-axis direction.

The indicator mrl_index is signaled depending on at least one of the intra prediction mode, the MPM information, the size (with and height) of the current block, the presence or absence of an upper boundary of a CTU, and the color component. When the indicator mrl_index is not signaled, the first reference sample line adjacent to the current block is used.

For example, when the intra prediction mode is a predetermined mode, the indicator mrl_index may be signaled. The intra prediction mode may be the intra prediction mode of the current block or at least one of the intra prediction modes of the respective neighboring blocks. The predetermined mode is at least one of non-directional prediction mode, directional prediction mode, vertical or horizontal mode, even-numbered mode, and odd-numbered mode. For example, when the intra prediction mode of a neighboring block adjacent to the left boundary or the upper boundary of the current block is one of directional modes, the indicator mrl_index may be signaled. Alternatively, when the intra prediction mode of the neighboring block is one of even-numbered modes or one of odd-numbered modes, the indicator mrl_index may be signaled. Further, in case the mrl_index is 0, the current block may be intra predicted using a Planar mode or a DC mode. In another example, in case the mrl_index is not 0, the current block may not be intra predicted in a Planar mode or a DC mode. For example, in case of a Planar mode, an intra prediction may be performed by fixing mrl_index as 0.

For example, the indicator mrl_index may be signaled on the basis of the MPM information of the current block. The MPM information include at least one of an MPM flag, an MPM index, an MPM list, and an MPM candidate. For example, when the MPM flag for the intra prediction mode of the current block indicates matching, the indicator mrl_index may be signaled. Alternatively, when any one directional prediction mode is present within an MPN candidate list or only directional prediction modes are present within the MPN candidate list, the indicator mrl_index may be signaled. Alternatively, when any one non-directional prediction mode is present in the MPM candidate line, the indicator mrl_index may be signaled. Alternatively, the MPM information of the current block is signaled differently depending on the indicator mrl_index. For example, when the indicator mrl_index has a value other than 0, at least one piece of the MPM information may not be signaled. For example, when the indicator mrl_index has a value other than 0, the MPM flag or the remaining mode information may not be signaled. That is, the indicator mrl_index is not 0, a process of deriving a remaining mode may not be performed, and intra prediction mode of the current block may not be derived using a remaining mode. On the other hand, when the indicator mrl_index has a value other than 0, the MPM index may be signaled and the intra prediction mode of the current block may be derived using the MPM index. For example, when the indicator mrl_index has a value other than 0, the MPM mode may be determined without parsing the MPM flag.

For example, when the size (width or height) of the current block is within a predetermined size range, the indicator mrl_index may be signaled. For example, when the size (width or height) is larger than a predetermined size (e.g., 4), the indicator mrl_index may be signaled.

For example, the indicator mrl_index may be signaled depending on whether the current block is located at the upper boundary of a CTU. For example, when the current block is located at the upper boundary of a CTU, the indicator mrl_index may not be signaled. That is, in case a Y-axis direction position of a top-left position of the current block is not the same as an upper position of a CTU, the indicator mrl_index may be signaled. The case where a Y-axis direction position of a top-left position of the current block is not the same as an upper position of a CTU may be determined as a case where a result obtained by performing modulo operation on a Y-axis direction position of a top-left position of the current block by a CTU size is greater than 0.

For example, the indictor mrl_index may be signaled when the color component of the current block is a luminance signal, and the indicator mrl_index may not be signaled when the color component is a chrominance signal.

Alternatively, the indicator mrl_index refers to a reference sample line to be used optionally. For example, the first reference sample line adjacent to the current block may be always used, and the reference sample line indicated by the indicator mrl_index may be optionally used.

When multiple reference sample lines are used, whether to apply filtering is determined for each reference sample line. For example, on the basis of the intra prediction mode and the block size/shape, filtering may be applied to the first reference sample line adjacent to the current block but the filtering may not be applied to the second and subsequent reference sample line around the current block. Alternatively, the filtering may be applied only to one reference sample line. For example, the filtering may be applied only to either a left reference sample line or an upper reference sample line. Which reference sample line is subjected to filtering may be determined depending on at least one of the shape, size, and intra prediction mode of the current block. The shape of the current block may be determined depending on a size comparison between the width and the height of the current block or a ratio of the width and the height.

The configured reference sample may be represented as ref[m, n], and a sample obtained by applying a filter to the configured reference sample may be represented as rec[m, n]. Herein, m or n may be a predetermined integer value representing a position of a sample. When a position of a left upper side sample within the current block is (0, 0), a position of a left upper side reference sample of the current block may be set to (−1, −1).

In order to select a reference sample, a length (range) of an upper reference sample of a current block and/or a length (range) of a left reference sample of the current block may be determined.

Figure 14:
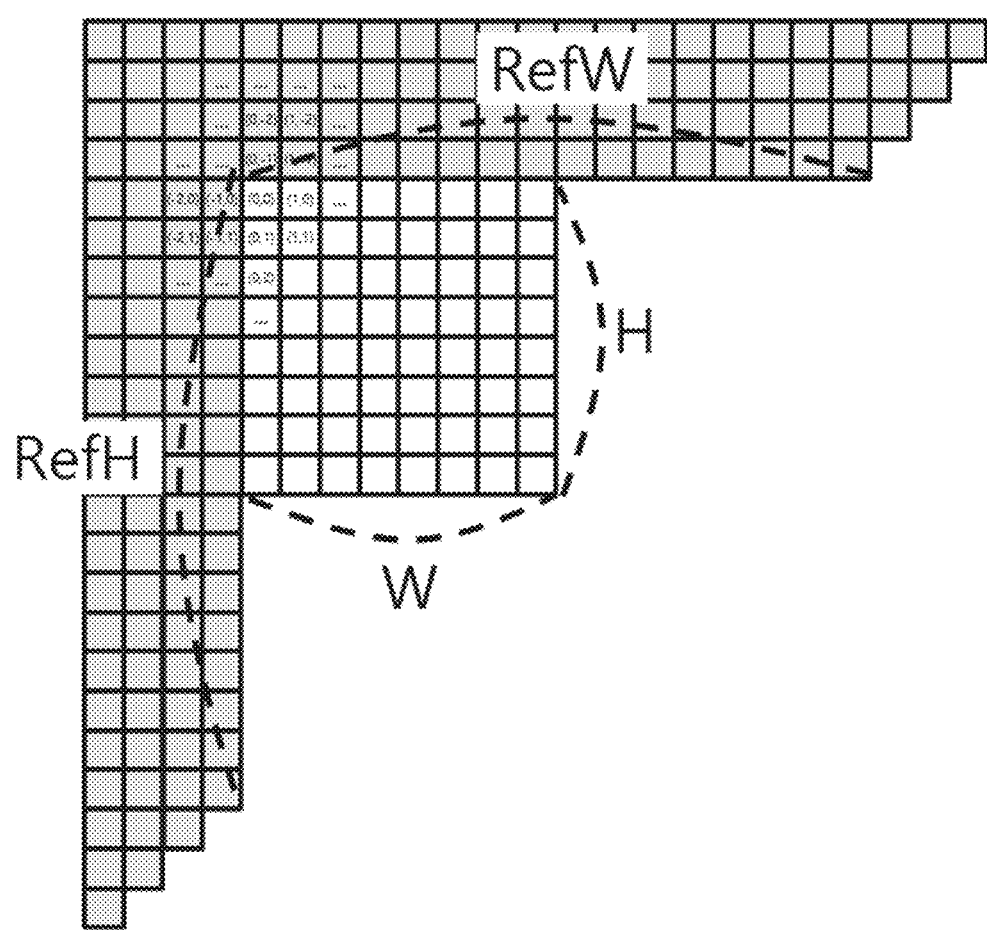
FIG. 14 is a view showing a length (range) of a reference sample of a current block.

FIG. 14 is a view showing a length (range) of a reference sample of a current block.

In FIG. 14, a length of an upper reference sample RefW and/or a length of a left reference sample RefH may be determined on the basis of horizontal W and vertical H sizes of a current block.

For example, a length (range) of a reference sample of a current block may be determined as a length (range) corresponding to N times a width or height of the current block. For example, N may be 2, and RefW=2*W, RefH=2*H.

For example, a length (range) of a reference sample of a current block may be determined as a length obtained by adding a width and a height of the current block. For example, RefW=W+H, RefH=H+W.

For example, when a width of a current block is greater than a height, a length of a left reference sample of the current block and a length of an upper reference sample may be determined by using different methods. For example, a length of an upper reference sample of a current block may be determined as twice a width of the current block. For example, a length of a left reference sample of the current block may be determined as four times a height of the current block. In other words, RefW=2*W, and RefH=4*H.

On the contrary, when a height of a current block is greater than a width, it may be, for example, RefW=4*W, and RefH=2*H.

For example, a predetermined sample length may be added to a default reference sample length according to a ratio of a width to a height of a current block. The default reference sample length may be RefW=2*W, and RefH=2*H. When a width of a current block is greater than a height, a length of a left reference sample may be, for example, RefH=2*H+K on the basis of a ratio of the width to the height. Herein, 2*H may correspond to a default length of a reference sample, and K may correspond to a predetermined sample length. Herein, K may be a predetermined integer.

The predetermined sample length K may be determined on the basis of a shape of a current block, an intra-prediction mode of the current block, mrl_index, a ratio of a width a height of the current block to, etc.

For example, when an intra-prediction mode of a current block is a vertical directional mode (for example, a mode equal to or greater than an upper-left diagonal mode), the K may be determined on the basis of Equation 1 below.

$K=\text{Max}(1, nTbW/nTbH)*mrl\_index+2$ [Equation 1]

In the Equation 1, nTbW and nTbH respectively mean a width and a height of a current block. The K additional samples may respectively have values of reference samples having an x coordinated of (RefW−1) among samples on a reference sample line indicated by mrl_index.

Similarly, when an intra-prediction mode of a current block is a horizontal directional mode (for example, a mode smaller than an upper-left diagonal mode), the K may be determined on the basis of Equation 2 below.

$K=\text{Max}(1, nTbH/nTbW)*mrl\_index+2$ [Equation 2]

In the Equation 2, nTbW and nTbH respectively mean a width and a height of a current block. The K additional samples may respectively have values of reference samples having a y coordinate of (RefH−1) among samples on a reference sample line indicated by mrl_index.

When selecting a reference sample, availability determination and reference sample padding may be performed for a block containing the reference sample to be used. For example, when a block containing a reference sample is available, the corresponding reference sample can be used. On the other hand, when a block containing a reference sample is not available, the unavailable reference samples in the block may be padded with one or more available neighboring reference samples.

When a reference sample is located outside the boundary of at least one of a picture, a tile group, a tile, a slice, or a coding tree block (CTB), the reference sample may be determined to be unavailable. When the current block is coded with constrained intra prediction (CIP), in the case where the block including the reference sample has been encoded/decoded in an inter prediction mode, the reference sample is determined to be unavailable.

Figure 15:
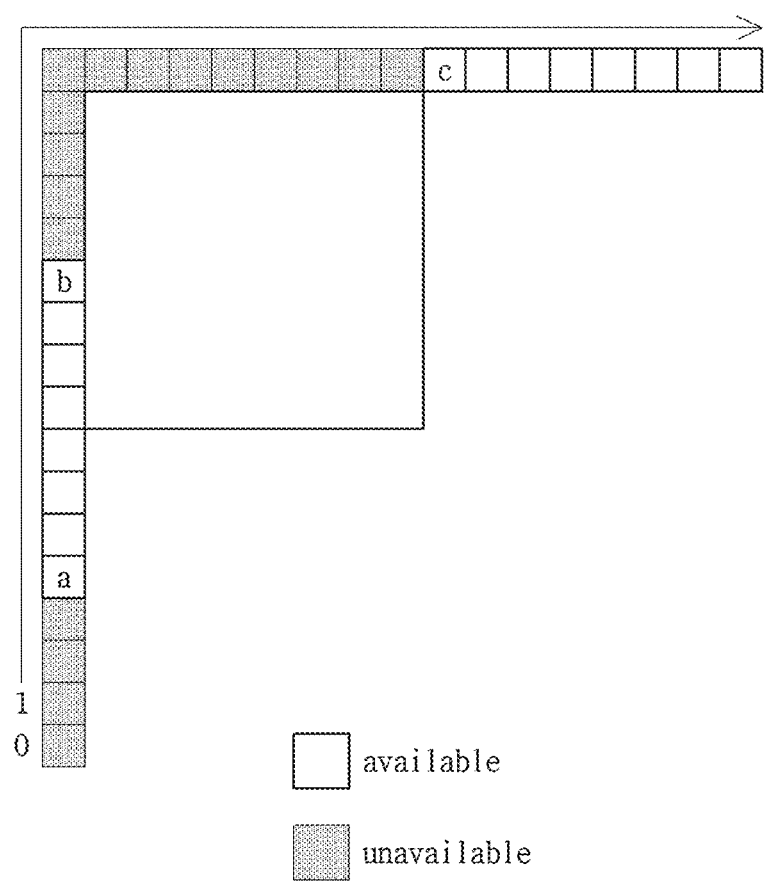
FIG. 15 is a diagram for describing a process of replacing an unavailable sample with an available sample.

FIG. 15 is a diagram for describing a process of replacing an unavailable sample with an available sample.

When it is determined that the reconstructed neighboring sample is not available, the unavailable sample may be replaced with a reconstructed neighboring sample, which is an available sample. For example, when there are both available samples and unavailable samples as illustrated in FIG. 15, one or more available samples can be used to replace one or more unavailable samples.

The sample values of the unavailable samples may be replaced with the values of the available samples in a predetermined order. The available samples used to replace the unavailable samples may be available samples located adjacent to the unavailable samples. When no available sample is adjacent to the unavailable sample, the earliest or closest available sample may be used to replace the unavailable sample. The replacing order of the unavailable samples may be, for example, from the bottom left to the top right. Alternatively, the replacing order may be from the top right to the bottom left. Specifically, the replacing order may be from the top left corner to the top right and/or to the bottom left. Alternatively, the replacing order may be from the top right and/or from the bottom left to the top left corner.

For example, filling the unavailable samples with the values of available samples may start from the position 0, which is the bottom left sample position. That is, the first four unavailable samples may be filled with a value of "a", and the subsequent 13 unavailable samples may be filled with a value of "b".

For example, the unavailable samples may be filled with a combined value of the available samples. For example, the unavailable samples may be filled with an average value or an interpolated value of the available samples respectively adjacent to both ends of a line of the unavailable samples. That is, the first four unavailable samples are filled with the value "a", and the next 13 unavailable samples may be filled with the average of a value of "b" and a value of "c", or may be filled by interpolating the value "b" and the value "c".

Alternatively, the 13 unavailable samples may be filled with an arbitrary intermediate value between the sample values "b" and "c" of the available samples. In this case, the unavailable samples may be filled with different respective values. For example, as the distance of an unavailable sample to the available sample having the value "a" decreases, the unavailable sample will be filled with a value that is closer to the value "a". For example, the closer an unavailable sample is to an available sample having the value "b", the closer the value that fills the unavailable sample is to the value "b". That is, the value of an unavailable sample may be determined based on the distance between the unavailable sample and the available sample having the value "a" or "b". To replace unavailable samples with available samples, one or more replacement methods including the methods described above may be adaptively used. The method of replacing unavailable samples with available samples may be signaled as information contained in a bitstream, or may be predetermined in the encoder/decoder. Alternatively, a replacement method may be derived according to a predetermined determination method.

For example, the replacement method may be determined based on the difference between the values "a" and "b" or based on the number of unavailable samples. More specifically, the replacement method may be determined by comparing the difference between the values of two available samples with a threshold value and/or by comparing the number of unavailable samples with a threshold value. For example, when the difference between the values of the two available samples is greater than the threshold value, and/or when the number of unavailable samples is greater than the threshold value, the unavailable samples may be replaced to have different values from each other. The selection of the method of replacing unavailable samples with available samples may be performed on a per-predetermined-unit basis. For example, the replacement may be selected on a per-video basis, a per-sequence basis, a per-picture basis, a per-slice basis, a per-slice group basis, a per-tile basis, a per-coding-tree-unit (CTU) basis, a per-coding-unit (CU) basis, a per-prediction-unit (PU) basis, a per-transform-unit (TU) basis, or a per-block basis. At this time, the selection of the method of replacing unavailable samples with available samples may be determined based on the information signaled on a per-predetermined-unit basis or may be derived on a per-predetermined-unit basis. Alternatively, the selection method for the replacement methods may be predetermined in the encoder/decoder.

When a reference sample is located at a predetermined position, padding may be automatically performed without determining whether a block including the reference sample is available or not. For example, referring to FIG. 15, when the position (x, y) of the top left corner sample of the current block is (0, 0), sample availability may not be determined for samples located at (x, y) in which the x coordinate or the y coordinate is equal to or greater than W+H (x=W+H or greater or y=W+H or greater), and the samples may be padded with neighboring reference samples.

For example, a sample ref[W+H, −2] may be padded with the value of a sample ref[W+H−1, −2] without performing the availability determination on the sample ref[W+H, −2]. As another example, a sample ref[W+H, −3] may be padded with the value of a sample ref[W+H−1, −3] without performing the availability determination on the sample[W+H, −3]. That is, the padding may be performed on the samples located at positions (x, y: x is equal to or greater than W+H or y is equal to or greater than W+H) by using the closest sample on the same sample line without performing the availability determination thereon.

When the position of the top left corner sample of the current block is (0, 0), for samples located at positions (x, y: x is equal to or greater than W and is less than W+H) among the samples located above the current block, the availability determination will be performed, and then the padding will be performed according to the result of the availability determination. For samples located at positions (x, y: y is equal to or greater than H and is less than W+H) among the samples located to the left of the current block, the availability determination will be performed, and the padding will be performed according to the availability determination.

For example, when the position of the top left corner sample of the current block is (0, 0), for samples corresponding to rec[x, −1] (x ranges from −1 to W+H−1) and/or samples corresponding to rec[−1, y](y ranges from 0 to H+W−1), the availability determination and the padding may be performed.

For the padding, a plurality of reference sample lines may be used. For example, when the padding is performed on a first reference sample line adjacent to (that is, the closest to) the current block, a second reference sample line, which is the second closest to the current block, may be used. For example, the padding may be performed according to Equation 3. That is, the sample values of the first reference sample line may be derived by using the weighted average of samples selected from the first reconstructed reference sample line and samples selected from the second reconstructed reference sample line. In this case, the selected reconstructed sample may be one located at a current sample position or at a position adjacent to the current sample position.

$$\text{ref}[x,-1]=(rec[x,-2]+3\times rec[x,-1]+2)>>2, (x=0\sim H+W-1) \quad \text{[Equation 3]}$$

For example, when an upper-right block of a current block is not present, the upper-rightmost reference sample (for example, ref(W−1, −1)) of the current block may be padded to a position of the upper-right reference sample.

When a reference sample is configured by using at least one of a reference sample line 2 to a reference sample line 3 which are adjacent to a current block, padding may be performed for a sample that exceeds a length of a reference sample line 1. Herein, availability may not be determined for the sample that exceeds the length so as to reduce complexity. For example, In FIG. 14, a reference sample line 3 exceeds a reference sample line 1 by two samples to the right. In addition, the reference sample line 3 exceeds the reference sample line 1 by two samples to the bottom. Herein, for the exceeding samples, padding to an adjacent reference sample may be performed. For example, the exceeding samples ref(2W, −3) and ref(2W+1, −3) may be padded to a reference sample ref(2W−1, −3).

Whether or not to apply filtering to a reference sample configured as above may be determined on the basis of at least one of an intra-prediction mode of a current block, a size of the current block, and a shape of the current block. When filtering is applied, a filter type may vary according to at least one of an intra-prediction mode of a current block, a size of the current block, and a shape of the current block.

For example, filtering may be performed on a reference sample configured by selecting and padding on a reference sample.

The filtering may be performed on the basis of at least one of an intra-prediction mode of a current block, a size of the current bloc and a shape of the current block, a reference sample line, and whether or not inter-prediction and intra-prediction are combined (for example, inter_intra_flag). For example, whether or not to apply filtering or a filter type may be determined on the basis of whether or not at least one of the intra-prediction mode and the size/shape of the current block satisfies a predetermined condition. The filter type may be at least one of a filter tap, a filter coefficient, and a filter shape.

For example, when an intra-prediction mode of a current block is a DC mode, the filtering may not be applied. Alternatively, when an intra-prediction mode of a current block is a planar mode, the filtering may be applied. Alternatively, when an intra-prediction mode of a current block is a diagonal mode, the filtering may be applied.

For example, when an intra-prediction mode of a current block corresponds to a second mode obtained by changing a mode, the filtering may not be applied. For example, when the intra-prediction mode corresponds to at least one mode of a mode −1 to a mode −10 or a mode 67 to a mode 76, the filtering may not be applied. Alternatively, when an intra-prediction mode of a current block corresponds to a predetermined mode among the second modes, the filtering may be applied.

When an intra-prediction mode of a current block is a mode that is not mentioned in the above, the filtering may not be applied.

For example, when a size of a current block is smaller than a predetermined size (for example, 8×8), the filtering may not be applied. For example, when a number of samples included in a current block is smaller than 32, the filtering may not be applied.

For example, when a shape of current block is a rectangle (for example, when horizontal and vertical sizes are different), whether or not to apply filtering may be determined on the basis of comparing the horizontal and vertical sizes or a ratio of the horizontal size to the vertical size.

For example, when a shape of current block is a rectangle and an intra-prediction mode corresponds to a predetermined mode, the filtering may not be applied. For example, when a width of a current block is twice a height, and an intra-prediction mode of the current block corresponds to at least one mode of a mode 2 to a mode 7, the filtering may not be applied.

For example, when a shape of current block is a rectangle and an intra-prediction mode corresponds to a predetermined mode, a filter type may be differently determined. For example, when the above condition is not satisfied, a 3-tap filter may be applied. Meanwhile, when a height of a current block is twice a width, and an intra-prediction mode of the current block corresponds to at least one mode of a mode 61 to a mode 66, a 5-tap filter may be applied.

For example, the filtering may be applied to a reference sample line 1 (for example, mrl_index=0). In addition, the filtering may not be applied to at least one of a reference sample line 2 to a reference sample line 4 (for example, mrl_index !=0).

For example, when prediction is performed by combining inter-prediction and intra-prediction (for example, inter_intra_flag=1), the filtering may not be applied when configuring a reference sample for intra-prediction. It may be efficient not to apply filtering since combined prediction is performed by applying a weighting factor to an inter-prediction value and an intra-prediction value.

Intra prediction for the current block may be performed based on the derived intra prediction mode and the constructed reference sample.

For example, non-directional intra prediction may be performed for the current block. The mode of the non-directional intra prediction may be at least one of a DC mode, a planar mode and an LM mode.

For the DC mode, prediction may be performed using the average value of one or more reference samples among the constructed reference samples. In this case, filtering may be applied to one or more prediction samples (also referred to as predicted samples) located at the boundary of the current block. The DC prediction may be adaptively performed based on at least one of the size of the current block and the shape of the current block. Further, the range of the reference samples used in the DC mode can be determined based on at least one of the size and the shape of the current block.

Figure 16:
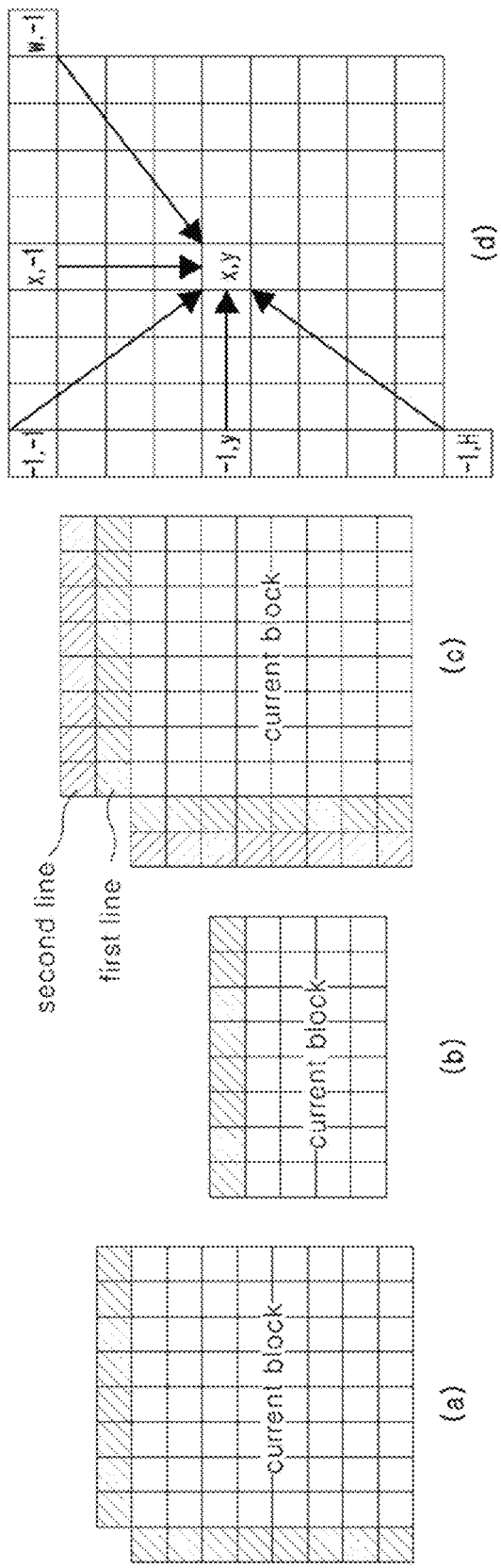
FIG. 16 is a diagram for describing intra prediction according to the shapes of the current block.

FIG. 16 is a diagram for describing intra prediction according to the shapes of the current block.

For example, when the current block is a square block, as illustrated in (a) of FIG. 16, DC prediction may be performed by using the average value of the reference sample located above the current block and the reference sample located to the left of the current block.

For example, when the current block is a non-square block, neighboring samples adjacent to the left end and the upper end of the current block may be selectively used. When the current block is a rectangular block, as illustrated in (b) of FIG. 16, the prediction may be performed using the average value of the reference samples adjacent to a longer side among the left side and the upper side of the current block. In this case, a boundary filtering may be performed for a prediction sample inside the current block adjacent to the shorter side among sizes of width and height of the current block. The boundary filtering may be performed for at least one prediction sample included in N numbers of columns inside the current block adjacent to a left reference sample and/or at least one prediction sample included in M numbers of rows inside the current block adjacent to an upper reference sample. In this case, N and M may be a positive integer or 0. Or a prediction may be performed by using a weighted sum of a reference sample adjacent to the longer side and a reference sample adjacent to the shorter side, among sizes of width and height of the current block. In this case, a relatively bigger weight may be assigned to a reference sample adjacent to the longer side for performing the weighted sum.

For example, when the size of the current block corresponds to a predetermined size or falls within a predetermined range, a predetermined number of reference samples, among the reference samples located above or to the left of the current block, are selected, and the prediction is performed using the average value of the selected reference samples. The predetermined size may be a fixed size of N×M, which is preset in the encoder/decoder. In this case, N and M are integers greater than 0, and N and M may be the same or different from each other. The predetermined range may mean a threshold value for selecting the reference samples for prediction of the current block. The threshold value may be set with at least one of a minimum value and a maximum value. The minimum value and/or the maximum value may be a fixed value or fixed values preset in the encoder/decoder, or a variable value or variable values that is/are encoded and then signaled by the encoder.

For example, one or more average values may be used to perform the prediction. When the current block is a square block or a non-square block, at least one of a first average value or a second average value may be used, in which the first average value is the average of the reference samples located above the current block and the second average value is the average of the reference samples located to the left of the current block. The DC prediction value of the current block may be the first average value or the second average value. Alternatively, the DC prediction value of the current block may be a weighted sum obtained by weighting the first average value and the second average value. For example, the weights for the first and second average values may be the same (that is, 1:1).

A range of predetermined reference samples used for calculating DC value may differ according to a block size and/or shape when the current block is W×H. For example, in case W, H, W*H and/or W+H is equal to or smaller than the first size, reference samples of the first group may be used. Or, in case W, H, W*H and/or W+H is equal to or bigger than the second size, reference samples of the second group may be used. The reference samples of the first group and/or the reference samples of the second group may include at least one reference sample selected from reference samples of a left side, an upper side, a lower side and a right side. The calculated DC value may be assigned as a sample value of an intra prediction block of the current block.

According to the above method, a shift operation can be used to calculate all of the DC values. For example, the method can be used even for the case where a sample length, which represents the width, the height, or the sum of the width and height of the current block, is not the power of two. The method may be applied to both luma DC prediction and chroma DC prediction. Alternatively, the method may be applied either to luma DC prediction or to chroma DC prediction.

For example, when the current block is a non-square block, the prediction may be performed based on either the width or the height of the current block. For example, a predicted value may be obtained by dividing the sum of the values of the upper reference sample and the left reference sample by the length of a longer side (namely, the width or the height) of the current block. In this case, the division operation using the value corresponding to the longer one among the width and the height may be performed by a shift operation.

In another embodiment, the accuracy of the intra prediction can be improved by generating a prediction block of the current block from the sample values of a block having a high correlation with the current block among the left neighboring block and the top neighboring block of the current block.

The correlation between the neighboring block and the current block is determined on the basis of at least one of the coding parameters (including the size, shape, division depth, prediction mode (inter or intra), and intra prediction mode) of the current block and/or the coding parameters of the neighboring blocks. For example, the neighboring block adjacent to a longer one between the height and the width of the current block is considered to have a higher correlation. Alternatively, the neighboring block that is intra-predicted is considered to have a higher correlation. Alternatively, the neighboring block that is intra-predicted with an intra prediction mode having a similar direction to the intra prediction mode of the current block is considered to have a higher correlation. When the current block is intra-predicted with a non-directional mode, the neighboring block that is intra-predicted with a non-directional mode is considered to have a higher correlation.

When the current block is a square block, the prediction is performed using the average value of the reference samples located on the left side of the current block. In this case, the reference sample filtering is performed only on the reference samples located above the current block. Additionally, the reference sample filtering is performed on the reference samples located on the left side of the current block. In this case, boundary filtering is performed on the top boundary in the prediction block of the current block. Additionally, the boundary filtering is performed on the left boundary in the prediction block of the current block.

Alternatively, when the current block is a square block, the prediction is performed using the average value of the reference samples located above the current block. In this case, the reference sample filtering is performed only on the reference samples located on the left side of the current block. Additionally, the reference sample filtering is performed on the reference samples located above the current block. In this case, the boundary filtering is performed on the left boundary of the prediction block of the current block. Additionally, the boundary filtering is performed on the top boundary of the prediction block of the current block.

Whether to perform DC mode-based prediction is determined according to least one of the coding parameters of the current block and the neighboring blocks.

When filtering is performed on the left reference samples and the top reference samples, at least one of the following factors differs between the left reference samples and the top reference samples: whether or not the filtering is performed, filter coefficients, a filter shape, and a filter tap count.

For example, depending on the size of the current block, the reference sample filtering for the left reference samples and the reference sample filtering for the top reference samples differ in terms of at least one factor among whether filtering is performed, the filter coefficients, the filter shape, and the filter tap count.

For example, depending on the shape of the current block, the reference sample filtering for the left reference sample and the reference sample filtering for the top reference sample differ in terms of at least one of the following factors: whether filtering is performed, the filter coefficient, the filter shape, and the filter tap count.

The boundary filtering for the left boundary within the prediction block of the current block and the boundary filtering for the top boundary within the prediction block of the current block differ in terms of at least one of the following factors: whether the filtering is performed, the filter coefficient, the filter shape, and the filter tap count.

For example, depending on the size of the current block, the boundary filtering for the left boundary within the prediction block of the current block and the boundary filtering for the top boundary within the prediction block of the current block differ in terms of at least one of the following factors: whether or not the filtering is performed, the filter coefficient, the filter shape, and the filter tap count.

For example, depending on the shape of the current block, the boundary filtering for the left boundary in the prediction block of the current block and the boundary filtering for the top boundary in the prediction block of the current block differ in terms of at least one of the following factors: whether or not the filtering is performed, the filter coefficient, the filter shape, and the filter tap count.

The boundary filtering is performed on at least one sample included in N columns adjacent to the left reference samples and/or at least one sample included in M rows adjacent to the top reference samples, within the prediction block of the current block. In this case, each of N and M is zero or a positive integer.

For example, the DC prediction may be performed using a plurality of reference sample lines. For example, the prediction may be performed using two reference sample lines, as illustrated in (c) of FIG. 16.

For example, the average value of the reference samples included in the two reference sample lines may be determined as the DC prediction value of the current block.

Alternatively, different weights may be applied to the reference samples of the first adjacent line and the reference samples of the second adjacent line of the current block. For example, a weighted average of each sample in the first reference sample line and each sample in the second reference sample line is calculated by applying the weights 3:1 to each sample in the first reference sample line and each sample in the second reference sample line (that is, (3× the first line reference sample+the second line reference sample+2)>>2), and the average of the weighted averages may be determined as the DC prediction value of the current block. Alternatively, the resultant value of ((3× the first line reference sample−the second line reference sample)>>1) may be obtained, and the average of these values may be determined as the DC prediction value of the current block. The weights are not limited to the above example, and any weights may be used. In this case, the closer to the current block the reference sample line is, the larger the weight that is applied to the reference sample line. The number of reference sample lines that can be used is not limited to two, and three or more reference sample lines may be used for prediction.

For the planar mode, prediction may be performed with a weighted sum as a function of the distance from at least one reference sample to an intra prediction target sample located in the current block.

Filtering may be performed on reference samples of the current block or prediction samples (that is, predicted samples) of the current block. For example, after filtering is applied to reference samples, planar prediction may be performed, and then filtering may be performed on one or more prediction samples. Among the prediction samples, filtering may be performed on samples in one, two, or N sample lines located at the top boundary or the left boundary of the current block.

To perform the planar prediction, a weighted sum of one or more reference samples may be used. For example, five reference samples may be used, as illustrated in (d) of FIG. 16. For example, to generate a prediction sample for a target position [x, y], the reference samples r[−1, −1], r[x, −1], r[−1, y], r[W, −1], and r[−1, H] may be used. In this case, W and H are the width and the height of the current block, respectively. For example, prediction samples pred[x, y] can be generated using Equation 4. In Equation 4, a, b, c, d, and e represent weights. N may be log 2(a+b+c+d+e).

$$pred[x,y]=(a \times r[-1,-1]+b \times r[x,-1]+c \times r[-1,y]+d \times r[W,-1]+e \times r[-1,H])>>N$$ [Equation 4]

A directional prediction mode refers to at least one of a horizontal mode, a vertical mode, and an angular mode having a predetermined angle.

In the horizontal mode or the vertical mode, prediction is performed using one or more reference samples arranged in a linear direction, i.e., in the horizontal direction or the vertical direction. A plurality of reference sample lines may be used. For example, when two reference sample lines are used, prediction may be performed using two reference samples arranged in a horizontal line or a vertical line. Similarly, when N reference sample lines are used, N reference samples arranged in a horizontal line or a vertical line may be used.

For the vertical mode, the statistics of a first reference sample (e.g., r[x, −1]) on a first reference sample line and a second reference sample (e.g., r[x, −2]) on a second reference sample line may be used to perform the directional prediction.

For example, the predicted value of the vertical mode can be determined by calculating the result value of (3×r[x, −1]+r[x, −2]+2)>>2. Alternatively, the predicted value of the vertical mode can be determined by calculating the result value of (3×r[x, −1]−r[x, −2]+1)>>1. In yet another alternative, the predicted value of the vertical mode can be determined by calculating the value of (r[x, −1]+r[x, −2]+1)>>1.

For example, the change between each of the sample values on the vertical line may be considered. For example, the predicted value of the vertical mode can be determined by calculating the result value of (r[x, −1]+(r[x, −1]−r[x, −2])>>1). In this case, N may be an integer equal to or greater than 1. As N, a fixed value may be used. Alternatively, N may increase with an increase in the y coordinate of a prediction target sample. For example, N=y+1.

Even for the horizontal mode, one or more methods used for the vertical mode can be used.

For an angular mode of a certain angle, prediction may be performed using one or more reference samples arranged in an oblique direction from an intra prediction target sample of the current block, or one or more samples neighboring the reference samples located in the oblique direction. In this case, a total of N reference samples may be used, wherein N may be 2, 3, 4, 5, or 6. It is also possible to perform prediction by applying at least one of an N-tap filter to the N reference samples. Examples of the N-tap filter include a 2-tap filter, a 3-tap filter, a 4-tap filter, a 5-tap filter, and a 6-tap filter. At this time, at least one of the reference samples may be located above the current block and the rest may be located to the left of the current block. The reference samples located above the current block (or the reference samples located to the left of the current block) may be located in the same line or in different lines.

According to another embodiment, intra prediction may be performed based on position information. In this case, the position information may be encoded/decoded, and a reconstructed sample block located at the position described above may be derived as an intra predicted block of the current block. Alternatively, a block similar to the current block may be searched for by the decoder, and the found block may be derived as the intra predicted block of the current block. The searching for a similar block may be performed in an encoder or a decoder. The range (search range) in which the search is performed may be limited to a predetermined range. For example, the search range may be limited to reconstructed sample blocks within a picture in which the current block is included. Alternatively, the search range may be limited to a CTU in which the current block is included or to a predetermined CU. That is, location information-based intra prediction may be performed by searching for a block similar to the current block among reconstructed samples within a CTU. The searching may be performed using a template. For example, one or more reconstructed samples adjacent to the current block are taken as a template, and a CTU is searched for samples similar to the template.

The location information-based intra prediction may be performed when the CTU consists of only intra coding modes or when the luminance block and the chrominance block have different partition structures. For example, for an inter prediction available slice (e.g., P or B slice), information indicating that the current CTU consists of only intra coding modes may be signaled. In this case, when the information indicates that a current CTU consists of only intra coding modes, the location information-based intra prediction may be performed. Alternatively, when the luminance block and the chrominance block in the current CTU have different partition structures (for example, when dual_tree or separate_tree is a value of 1), the location information-based intra prediction may be available. On the other hand, when a CTU includes intra coding blocks and inter coding blocks or when the luminance block and the chrominance block have the same partition structure, location information-based intra prediction may not be available.

According to a further embodiment, inter color component intra prediction is performed. For example, it is possible to intra-predict chroma components from the corresponding reconstructed luma component of the current block. Alternatively, it is possible to intra-predict one chroma component Cr from the corresponding reconstructed chroma component Cb of the current block.

An inter color component intra prediction includes a color component block restructuring step, a prediction parameter deriving step, and/or an inter color component prediction execution step. The term 'color component' may refer to at least any one of a luma signal, a chroma signal, Red, Green, Blue, Y, Cb, and Cr. A prediction of a first color component can be performed by using at least any one of a second color component, a third color component, and a fourth color component. The signals of the color components used for the prediction may include at least any one of an original signal, a reconstructed signal, a residual signal, and a prediction signal.

When performing an intra prediction for a second color component target block, a sample of a first color component corresponding block that corresponds to the second color component target block, a sample of a neighbor block of the first color component corresponding block, or both of the samples may be used. For example, when performing an intra prediction for a chroma component block Cb or Cr, a reconstructed luma component block Y corresponding to the chroma component block Cb or Cr may be used.

When predicting the chroma components on the basis of the luma component, the prediction may be performed according to Equation 5.

$$\text{Pred}_C(i,j) = \alpha \cdot rec_L'(i,j) + \beta \quad \text{[Equation 5]}$$

In Equation 5, $\text{Pred}_C(i, j)$ represents a predicted chroma sample of the current block, and $rec_L(i, j)$ represents a reconstructed luma sample of the current block. At this time, $rec_L'(i, j)$ may be a down-sampled reconstructed luma sample. Parameters $\alpha$ and $\beta$ may be derived by minimizing a regression error between the reconstructed neighboring luma sample and the reconstructed neighboring chroma sample around the current block.

The prediction for the current block can be performed by combining one or more exemplary prediction methods described above.

For example, the prediction for the current block may be performed by calculating the weighted sum of a prediction value obtained using a predetermined non-directional intra prediction mode and a prediction value obtained using a predetermined directional intra prediction mode. In this case, the weights may vary depending on at least one of the intra prediction mode of the current block, the size/shape of the current block, and the position of the prediction target sample.

For example, the prediction for the current block may be performed by calculating the weighted sum of a prediction value obtained using a predetermined intra prediction mode and a prediction value obtained using a predetermined inter prediction mode. In this case, the weights may vary depending on at least one of the encoding mode, the intra prediction mode, the inter prediction mode, and the size/shape of the current block. For example, when the intra prediction mode is a non-directional mode such as DC or Planar, a weight corresponding to ½ may be applied to an intra prediction sample and an inter prediction sample, respectively. Alternatively, when the intra prediction mode is a vertical mode, the weight for the intra prediction sample decreases with distance from the reference sample line above the current block. Similarly, when the intra prediction mode is a horizontal mode, the weight for the intra prediction sample decreases with distance from the reference sample line on the left side of the current block. The sum of the weight applied to the intra prediction sample and the weight applied to the inter prediction sample may be any one of the powers of two. That is, it may be any of 4, 8, 16, 32, and so forth. For example, when the size of the current block is within a predetermined size range, a weight corresponding to ½ may be applied to the intra prediction sample and the inter prediction sample, respectively.

The weight may be determined based on a prediction mode of a neighbor block. For example, in case both a left neighbor block and an upper neighbor block are intra predicted, a weight applied to an intra predicted block of the current block (e.g. a predicted block in a Planar mode) and a weight applied to an inter predicted block (e.g. a predicted block in a merge mode) may be ¾ and ¼, respectively. On the contrary, in case both a left neighbor block and an upper neighbor block are not intra predicted (including a case of an unavailable block), a weight applied to an intra predicted block of the current block and a weight applied to an inter predicted block may be ¼ and ¾, respectively. In case, among a left neighbor block and an upper neighbor block, one is intra predicted and the other is not intra predicted (including a case of an unavailable block), a weight applied to an intra predicted block of the current block and a weight applied to an inter predicted block may be equally ½. The intra prediction mode may be fixed to DC mode and Planar mode, or may be determined through signaling of information. Alternatively, the intra prediction mode may be any mode selected from among MPM candidate modes, and may be determined through The MPM candidate modes are derived from the intra prediction modes of neighboring blocks. The mode of the neighboring block can be replaced with a predetermined representative mode. For example, the intra prediction mode of a neighboring block is a directional mode of a specific direction categorized into a vertical direction group, the mode of the neighboring block is replaced with the vertical mode. On the other hand, when the intra prediction mode of a neighboring block is a directional mode of a specific direction categorized into a horizontal direction group, the mode of the neighboring block is replaced with the horizontal mode.

The inter prediction may be at least one of SKIP mode, merge mode, and AMVP mode. When the inter prediction mode of the current block is merge mode, the prediction for the current block may be performed by calculating the weighted sum of the inter prediction value obtained by using motion information corresponding to a merge index and the prediction value obtained by using DC or Planar mode.

For example, the prediction for the current block may be performed by calculating the weighted sum of one or more prediction samples obtained by using multiple sample lines. For example, the prediction may be performed by calculating the weighted sum of a first prediction value obtained by using the first reference sample line near the current block and a second prediction value obtained by using the second and onward reference sample lines near the current block. The reference sample lines used to obtain the second prediction value may be reference sample lines indicated by mrl_index. The weights for the first prediction value and the second prediction value may be equal. Alternatively, the weights for the first prediction value and the second prediction value may vary depending on at least one of the intra prediction mode of the current block, the size/shape of the current block, and the position of the sample to be prediction. The first prediction value may be a value predicted using a predetermined mode. For example, the first prediction value may be a value predicted using at least one of DC mode and Planar mode. The second prediction value may be a value predicted using the intra prediction mode of the current block, which is derived in the available intra prediction mode derivation step.

When prediction is performed by calculating the weighted sum of one or more prediction samples, filtering may not be performed on the prediction samples.

For example, an intra prediction block of the current block is constructed by calculating the sum of the blocks predicted respectively using a predetermined non-directional intra prediction mode and a predetermined directional intra prediction mode. In addition, the weights vary according to at least one of an intra prediction mode, a block size, and a sample position.

For example, when combining one or more intra prediction modes, a prediction block is constructed by calculating the weighted sum of a prediction value obtained using an intra prediction mode of the current block and a prediction value obtained using a predetermined mode included in an MPM list.

When using at least one of the intra prediction methods described above, intra prediction can be performed using one or more reference sample sets. For example, intra prediction for the current block is performed by using the weighted sum of an intra prediction block generated by using unfiltered reference samples and an intra prediction block generated by using filtered reference samples.

In the process of using at least one of the intra prediction methods described above, a filtering process using neighboring reconstructed samples is performed. Whether the filtering process is performed is determined on the basis of at least one of the intra prediction mode, the size, and the shape of the current block. The filtering is a processing operation included in an intra prediction process. When performing the filtering, at least one of a filter tap, a filter coefficient, a filter tap count, a filter coefficient, the number of filtering target lines, and the number of filtering target samples varies depending on at least one of the intra prediction mode, the size, and the shape of the current block.

Different directional intra prediction may be performed for a predetermined sample group unit of the current block. The predetermined sample group unit may be a block, a subblock, line or a single sample . . . .

When performing the directional prediction, directional prediction may be performed by changing a mode form a first intra-prediction mode to a second intra-prediction mode.

A method of changing a mode from a first mode to a second mode may be identically performed as the method described in the deriving of the intra-prediction mode. For example, the method may be performed on the basis of at least one of an intra-prediction mode, a size, and a shape of a current block.

When performing the directional prediction, prediction may be performed by applying at least one type of an interpolation filter. The filter type may represent at least one of a number of filter taps, a filter coefficient, and a filter shape. An N-tap filter may be applied to a reference sample. Herein, a number N of filter taps may be a predetermined integer. For example, filter types according to a number of filter taps may include a 2-tap bilinear filter, a 4-tap filter, a 6-tap filter, etc. Herein, a filter coefficient value may have a value of a cubic or Gaussian shape.

Figures 17, 18:
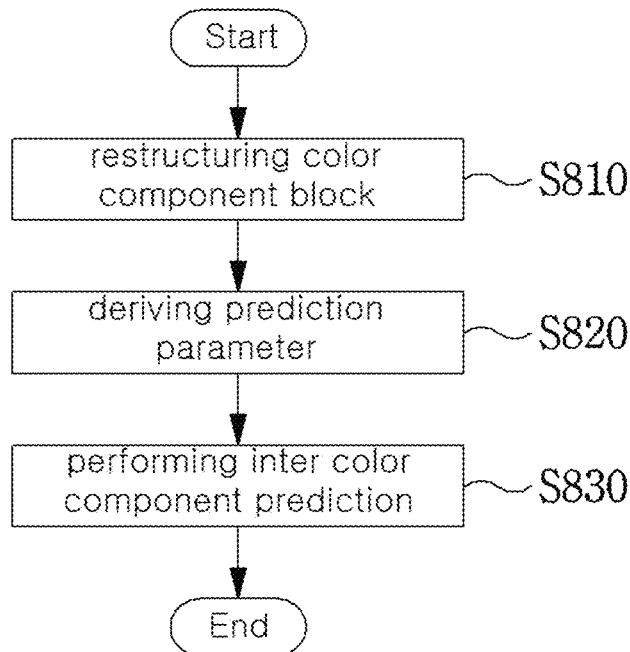
FIG. 17 is a view showing an example of a filter coefficient of a 4-tap cubic filter and a Gaussian filter.
FIG. 18 is a diagram illustrating an inter color component intra prediction process.

FIG. 17 is a view showing an example of a filter coefficient of a 4-tap cubic filter and a Gaussian filter.

As shown in FIG. 17, a filter coefficient of a 4-tap cubic filter and a filter coefficient of a Gaussian filter may be differently determined according to a phase. Herein, a phase may have a precision of 1/N. For example, N may be 32 or 64.

An example shown in FIG. 17 shows a filter coefficient of a filter in association with a 1/32 phase. A filter coefficient of a filter corresponding to a phase 15 to a phase 1 may be used for a filter coefficient of a filter corresponding to a phase 17 to a phase 32 by flipping the filter coefficient in a horizontal. For example, filter coefficients of a phase 17 of a cubic filter may be {−16, 135, 153, −16} obtained by performing flipping for filter coefficients of a phase 15 which are {−16, 153, 135, −16}.

The interpolation filter type may be differently determined on the basis of at least one of an intra-prediction mode of a current block, a size/shape of the current block, and a reference sample line.

For example, when an intra-prediction mode of a current block is a predetermined mode, a cubic filter may be applied. For example, the predetermined mode may be a directional prediction mode adjacent to a horizontal mode or adjacent to a vertical mode. Alternatively, when an intra-prediction mode of a current block is an intra-prediction mode where filtering is applied to the above-described reference sample, a cubic filter may be applied. Otherwise, a Gaussian filter may be applied.

For example, a filter type may be determined by comparing a width and a height of a current block or a shape of the current block with a predetermined condition. Using a size/shape of the current block may mean at least one of a width, a height, the sum or average of the width and the height, comparing the width with the height, and a ratio of the width to the height. The size may be a number of samples or a value obtained by applying a log to the number of samples. For example, when an average of log values of a width and a height of a current block is smaller than a predetermined value, a Cubic filter may be applied, and when the average is greater than a predetermined value, a Gaussian filter may be applied.

For example, when a size/shape of a current block satisfies a predetermined condition and an intra-prediction mode of the current block is a predetermined mode, a Gaussian filter may be applied. In addition, when at least one of the above is not satisfied, a cubic filter may be applied. The predetermined mode may be differently defined according to a size/shape of the current block.

For example, a filter type may be determined on the basis of a reference sample line that is used for prediction. For example, when a reference sample used for directional prediction is a reference sample line 1 (for example, mrl_index=0), a filter type may be determined on the basis of the intra-prediction mode and the size/shape of the block. Meanwhile, when a reference sample used for prediction is at least one of a reference sample line 2 to a reference sample line 4 (for example, mrl_index !=0), a cubic filter may be fixedly applied.

According to another embodiment of the present invention, an inter color component intra prediction may be performed. FIG. 18 is a diagram illustrating an inter color component intra prediction process. The inter color component intra prediction includes a color component block restructuring step S810, a prediction parameter deriving step S820, and/or an inter color component prediction execution step S830. The term 'color component' may refer to at least any one of a luma signal, a chroma signal, Red, Green, Blue, Y, Cb, and Cr. A prediction of a first color component can be performed by using at least any one of a second color component, a third color component, and a fourth color component. The signals of the color components used for the prediction may include at least any one of an original signal, a reconstructed signal, a residual signal, and a prediction signal.

When performing an intra prediction for a second color component target block, a sample of a first color component corresponding block that corresponds to the second color component target block, a sample of a neighbor block of the first color component corresponding block, or both of the samples may be used. For example, when performing an intra prediction for a chroma component block Cb or Cr, a reconstructed luma component block Y corresponding to the chroma component block Cb or Cr may be used. Alternatively, when performing an intra prediction for a chroma component block Cr, a chroma component block Cb may be used. Alternatively, when performing an intra prediction for a fourth color component block, at least one of a first color component block, a second color component block, and a third color component, all of which correspond to the fourth color component block, may be used.

Whether or not to perform an inter color component intra prediction may be determined based on at least any one of the size and the shape of a current target block. For example, when the size of the target block is equal to that of a coding tree unit (CTU), larger than a predetermined size, or within a predetermined size range, the inter color component intra prediction for the target block can be performed. For example, when a size of the current target block is 64×64, the inter color component intra prediction may be performed. Alternatively, when the shape of the target block is a predetermined shape, the inter color component intra prediction for the target block can be performed. The predetermined shape may be a square shape. In this case, when the target block has an oblong shape, the inter color component intra prediction for the target block may not be performed. Meanwhile, when the predetermined shape is an oblong shape, the embodiment described above inversely operates. Alternatively, in case that a partitioning shape of the first color component block is identical to a partitioning shape of the second color component block, the inter color component intra prediction may be performed.

Alternatively, whether or not to perform an inter color component intra prediction for a prediction target block may be determined based on a coding parameter of at least any one block selected from among a corresponding block corresponding to the prediction target block and neighbor blocks of the corresponding block. For example, when the corresponding block has been predicted through an intra prediction method in a constrained intra prediction (CIP) environment, an inter color component intra prediction for the prediction target block may not be performed. Alternatively, when the intra prediction mode of the corresponding block is a predetermined mode, an inter color component intra prediction for the prediction target block can be performed. Further alternatively, whether or not to perform an inter color component intra prediction may be determined on the basis of at least any one of CBF information of the corresponding block and CBF information of the neighbor blocks thereof. The coding parameter is not limited to a prediction mode of a block but various parameters that can be used for encoding/decoding may be used.

The above various embodiment for determining whether to perform the inter color component intra prediction may be applied in combination of at least two embodiments. For example, a size of a block and a partitioning shape of a block may be considered at the same time.

The color component block restructuring step S810 will be described below.

When predicting a second color component block by using a first color component block, the first color component block may be restructured. For example, when an image has an YCbCr color space and when a sampling ratio of color components is one of 4:4:4, 4:2:2, and 4:2:0, the block sizes of color components may differ from each other. Therefore, when predicting a second color component block using a first color component block having a different size from the second color component block, the first color component block may be restructured such that the block sizes of the first color component and the second color component are equalized. The restructured block may include at least any one of a sample in the first color component block that is a corresponding block and a sample in a neighbor block of the first color component block.

As described above, when configuring a reference sample, an indicator in association with a predetermined line among a plurality of reference sample lines may be signaled. Herein, during re-configuration, re-configuration may be performed by using a predetermined line in association with the signaled indicator.

For example, when the indicator (for example, mrl_index) is 3, re-configuration may be performed by using a reference sample line 4 that is adjacent to a first color component corresponding block. Herein, when re-configuration is performed by using at least two reference sample lines, a reference sample line 3 may be additionally used.

For example, when the indicator (for example, mrl_index) is 1, re-configuration may be performed by using a reference sample line 2 adjacent to a first color component corresponding block.

A reference sample line that is not indicated by the indicator (for example, mrl_index) may not be used during re-configuration. For example, when it is signaled that the indicator indicates one of a reference sample line 1, a reference sample line 2, and a reference sample line 4, a reference sample line 3 may not be used during re-configuration. In other words, when performing intra-prediction, samples corresponding to a reference sample line 3 may not be loaded by accessing the memory.

A method of using the indicator (for example, mrl_index) during re-configuration may be used for a case where partition structures of a first color component block and a second color component block are identical. For example, when a first color component block and a second color component block within a single CTU have the same partition structure that is a single tree, re-configuration based on the above indicator may be performed.

In the restructuring process, when a boundary of the second color component block (target block) or a boundary of the first color component block (corresponding block) is a boundary of a predetermined region, the reference samples used for the restructuring may be differently selected. In this case, the number of reference sample lines at the upper side may differ from the number of reference sample lines at the left side. The predetermined region may be at least any one of a picture, a slice, a tile, a CTU, and a CU.

For example, when the upper boundary of the first color component corresponding block is the boundary of the predetermined region, the reference samples at the upper side may not be used for the restructuring but only the reference samples at the left side may be used for the restructuring. When the left boundary of the first color component corresponding block is the boundary of the predetermined region, the reference samples at the left side may not be used for the restructuring but only the reference samples at the upper side may be used for the restructuring.

Alternatively, both of N reference sample lines at the upper side and M reference sample lines at the left side may be used for the restructuring, in which N may be smaller than M. For example, when the upper boundary corresponds to the boundary of the predetermined region, N may be 1. Meanwhile, when the left boundary corresponds to the boundary of the predetermined region, M may be 1.

Alternatively, the restructuring may be performed by using N reference sample lines at the upper side and M reference left sample lines at the left side of the first color component corresponding block, regardless of whether the boundary of the predetermined region is the upper boundary or the left boundary of the first color component block.

Hereinbelow, the prediction parameter deriving step S820 will be described.

A prediction parameter can be derived using at least any one of reference samples of the restructured first color component corresponding block and reference samples of the second color component prediction target block. Hereinafter, the terms 'first color component' and 'first color component block' may respectively refer to a restructured first color component and a restructured first color component block.

For example, the prediction parameter can be derived by adaptively using the reference samples of the restructured first color component, on the basis of the intra prediction mode of the first color component corresponding block. In this case, the reference samples of the second color component can be adaptively used on the basis of the intra prediction mode of the first color component corresponding block.

Hereinbelow, the inter color component prediction execution step S830 will be described.

As described above, after prediction parameters are derived, an inter color component intra prediction can be performed using at least any one of the derived prediction parameters.

The inter color component prediction method also can apply to an inter prediction mode. For example, when predicting a current block through an inter prediction method, an inter prediction may be performed with respect to a first color component and an inter color component prediction may be performed with respect to a second color component. In this case, the first color component may be a luma component, and the second color component may be a chroma component. The inter color component prediction can be adaptively performed in accordance with the coding parameter of the first color component. For example, whether or not to perform the inter color component prediction may be determined on the basis of CBF information of the first color component. The CBF information may be information representing presence or absence of a residual signal. That is, when the CBF of the first color component is 1, the inter color component prediction for the second color component may be performed. Meanwhile, when the CBF of the first color component is 0, the inter color component prediction for the second color component is not performed but the inter prediction for the second color component is performed. Alternatively, a flag indicating whether or not to perform the inter color component prediction may be signaled. The flag in the above embodiment may be signaled only when the inter color component prediction can be performed.

When performing the inter-color component prediction, inter-color component prediction may be performed on a second color component when an encoding mode of a first color component is an inter-mode.

For example, when performing inter-prediction on a current block, inter-prediction may be performed on a first color component, and inter-color component prediction may be performed on a second color component. For example, the first color component may be a luma component, and the second color component may be a chroma component.

Inter-color component prediction may be performed by using a prediction sample or reconstructed sample of the luma component. For example, after performing inter-prediction on the luma component, prediction on a chroma component may be performed by applying an inter-color component prediction parameter to a prediction sample. Herein, the prediction sample may mean a sample for which at least one of motion compensation, motion correction, OBMC (overlapped block motion compensation), and BIO (bi-directional optical flow) is performed.

The inter-color component prediction may be adaptively performed according to a coding parameter of a first color component. For example, whether or not to perform the inter-color component prediction may be determined according to CBF information of the first color component. The CBF information may be information representing whether or not a residual signal is present. In other words, when a CBF of the first color component is 1, inter-color component prediction may be performed on a second color component. Meanwhile, when a CBF of the first color component is 0, the inter-prediction may be performed on a second color component rather than performing inter-color component prediction.

A flag representing whether or not to perform the inter-color component prediction may be signaled. For example, the flag may be signaled on the basis of a CU or PU.

When a coding parameter of the first color component satisfies a predetermined condition, a flag representing whether or not perform the inter-color component prediction may be signaled. For example, when a CBF of the first color component is 1, whether or not to perform color component prediction may be determined by signaling the flag.

When performing inter-color component prediction on the second color component, an inter-motion prediction value or inter-motion estimation value of the second color component may be used. For example, inter-motion prediction or inter-motion estimation on a second color component may be performed by using information on inter-prediction for the first color component. In addition, a final prediction value may be generated by a weighted sum of an inter-color component prediction value of the second color component and an inter-motion estimation value of the second color component.

As described above, decoding a second color component block may include summing an inter-color component prediction value and an inter-motion estimation value. Whether or not the decoding of a second color component block includes the above process may be determined on the basis of a size of a second color component block, whether or not the second color component block includes at least one coefficient other than 0, and/or a syntax element signaled through a bitstream. For example, when a number of samples included in a second color component block is equal to or smaller than four, the above process may not be performed to decode the second color component block. Information on whether or not a second color component block includes at least one coefficient other than 0 may be signaled through a bitstream. In addition, the syntax element may be signaled in at least one level of a sequence level, a picture level, a slice level, a tile group level, and a tile level.

The inter-color component prediction value may be generated on the basis of a first color component corresponding block in association with a second color component block or a neighbor block of the first color component corresponding block. For example, the inter-color component prediction may be performed by obtaining a section of a first color component corresponding block on the basis of an average value of reconstructed samples included in a neighbor block of the first color component corresponding block, calculating a scale value of the obtained section, and performing scaling on a primary value of a second color component block (for example, a residual block of the second color component block) by using the scale value. As above, for example, a relation with the first color component corresponding block may be used when generating a residual block of the second color component block.

Alternatively, when an inter-prediction mode of a current block is a merge mode, a final prediction value of a second color component of the current block may be generated by a weighted sum of a value predicted by using motion information corresponding to a merge index, and a value predicted by performing the inter-color component prediction. Herein, a first color component block used for performing the inter-color component prediction may have at least one of a value predicted by performing inter-prediction (for example, merge mode) and a reconstructed value. A weighting factor for the weighted sum may be 1:1.

Filtering may be applied to a prediction sample generated by performing the intra-prediction.

Filtering on the prediction sample may be performed on the basis of at least one of an intra-prediction mode of a current block, a size/shape of the current block, a reference sample line, and whether or not to combine inter-prediction and intra-prediction (for example, inter_intra_flag). For example, whether or not to apply filtering or filter type may be determined on the basis of whether or not at least one of an intra-prediction mode of a current block, and a size/shape of the current block satisfies a predetermined condition. The filter type may be at least one of a filter tap, a filter coefficient, and a filter shape.

For example, when an intra-prediction mode of a current block corresponds to at least one of a DC mode, a planar mode, and a predetermined directional mode, filtering may be applied to a prediction sample. The predetermined directional mode may be at least one of a mode 2 to a mode 66. For example, the predetermined directional mode may be a vertical mode (mode 50) and a horizontal mode (mode 18). Alternatively, the predetermined directional mode may be a mode equal to or smaller than a mode 18, and a mode equal to or greater than a mode 50. Meanwhile, when an intra-prediction mode of a current block corresponds to at least one of a mode −1 to a mode −10 or a mode 67 to a mode 76, filtering may not be applied to the prediction sample.

For example, a number of filter taps may be differently determined on the basis of an intra-prediction mode of a current block. For example, when an intra-prediction mode of a current block is a DC mode, a 4-tap filter may be applied. When an intra-prediction mode of a current block corresponds to at least one of planar, horizontal, vertical and diagonal modes, a 3-tap filter may be applied. When an intra-prediction mode of a current block corresponds to a predetermined directional mode, a 2-tap filter may be applied. A number of the filter taps may be changed by replacing a value of at least one filter coefficient with 0.

For example, when a size/shape of a current block satisfies a predetermined condition, filtering may be applied to the prediction sample. For example, when a width is smaller than 64 and a height is smaller than 64, the filtering may be applied. Alternatively, when an average value of a log value of a width and a log value of a height is smaller than 6, the filtering may be applied. Alternatively, when a width is equal to or greater than 4 and a height is equal to or greater than 4, the filtering may be applied.

For example, when a shape of a current block is a rectangle (for example, when horizontal and vertical sizes are different), filtering may be applied to a prediction sample on the basis of comparing a width with a height and/or a ratio of a width to a height.

When a shape of a current block is a rectangle and an intra-prediction mode corresponds to a predetermined mode, the filtering may not be applied. For example, when a width of a current block is twice a height, and the intra-prediction mode corresponds to at least one mode of a mode 2 to a mode 7, the filtering may not be applied.

For example, a number of prediction sample lines to which the filter is applied may be differently determined on the basis of at least one of an intra-prediction mode of a current block and a size/shape of the current block. The prediction sample line may mean a prediction sample line adjacent to a reference sample. For example, when a size of a current block is smaller than a predetermined size, filtering may be applied to N prediction sample lines. In addition, when a size of a current block is greater than the predetermined size, filtering may be applied to M lines. For example, when a size of a current block is 32×32, filtering may be applied to six prediction sample lines. Alternatively, when a size of a current block is 4×4, filtering may be applied to three prediction sample lines. The number of prediction sample lines may be differently determined for a width and a height.

Filtering on a prediction sample may be differently applied on the basis of a reference sample line that is used for prediction. For example, when a reference sample used for prediction corresponds to a reference sample line 1 (for example, mrl_index=0), filtering on a prediction sample may be performed on the basis of an intra-prediction mode of a current block and a size/shape of the block. Meanwhile, when a reference sample used for prediction corresponds to at least one of a reference sample line 2 to a reference sample line 4 (for example, mrl_index !=0), filtering on a prediction sample may not be performed.

When inter-prediction and intra-prediction are performed on a current block by combining the predictions (for example, inter_intra_flag=1), filtering may not be applied to an intra-prediction sample of the current block. The combined prediction is performed by applying a weighting factor to an inter-prediction value and an intra-prediction value, and thus filtering is not applied to a prediction sample so as to reduce complexity and improve prediction efficiency.

Filtering on an intra-prediction sample may be performed by using the prediction sample and at least one reference sample.

For example, when an intra-prediction mode of a current block corresponds to at least one of DC, planar, horizontal and vertical modes, filtering on a prediction sample may be performed by using at least one of reference samples positioned in the upper, the left, and the upper-left of the prediction sample. For example, filtering may be performed by using Equation 6 below. In Equation 6, P(x', y') may mean a filtering target prediction sample, $R_{-1,y}$ may mean a left reference sample, $R_{x,-1}$ may mean an upper reference sample, and $R_{-1,-1}$ may mean an upper-left reference sample. In addition, wL, wT, and wTL may respectively mean filter coefficients of reference samples. A filter coefficient of the filtering target prediction sample may be a value obtained by subtracting the sum of filter coefficients of the reference samples from a predetermined value. The predetermined value may be 32 or 64.

$$P(x',y')=(wL*R_{-1,y}+wT*R_{x,-1}-wTL*R_{-1,-1}+(64-wL-wT+wTL)*P(x',y')+32)>>6 \quad \text{[Equation 6]}$$

Figure 19:
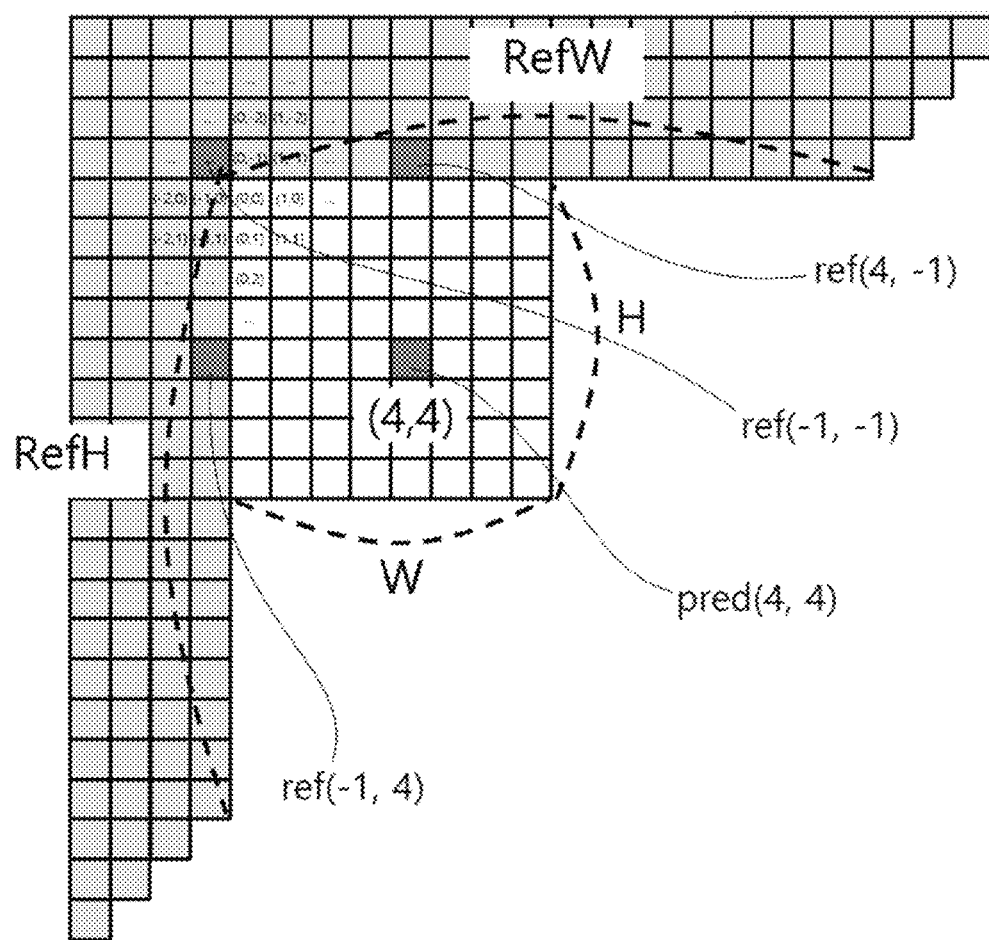
FIG. 19 is a view showing an example of performing filtering on a prediction sample by using a reference sample.

FIG. 19 is a view showing an example of performing filtering on a prediction sample by using a reference sample.

In an example shown in FIG. 19, when filtering is performed on a prediction sample pred(4, 4), at least one reference sample of reference samples of ref(4, −1), ref(−1, 4), and ref(−1, −1) may be used.

Figure 20:
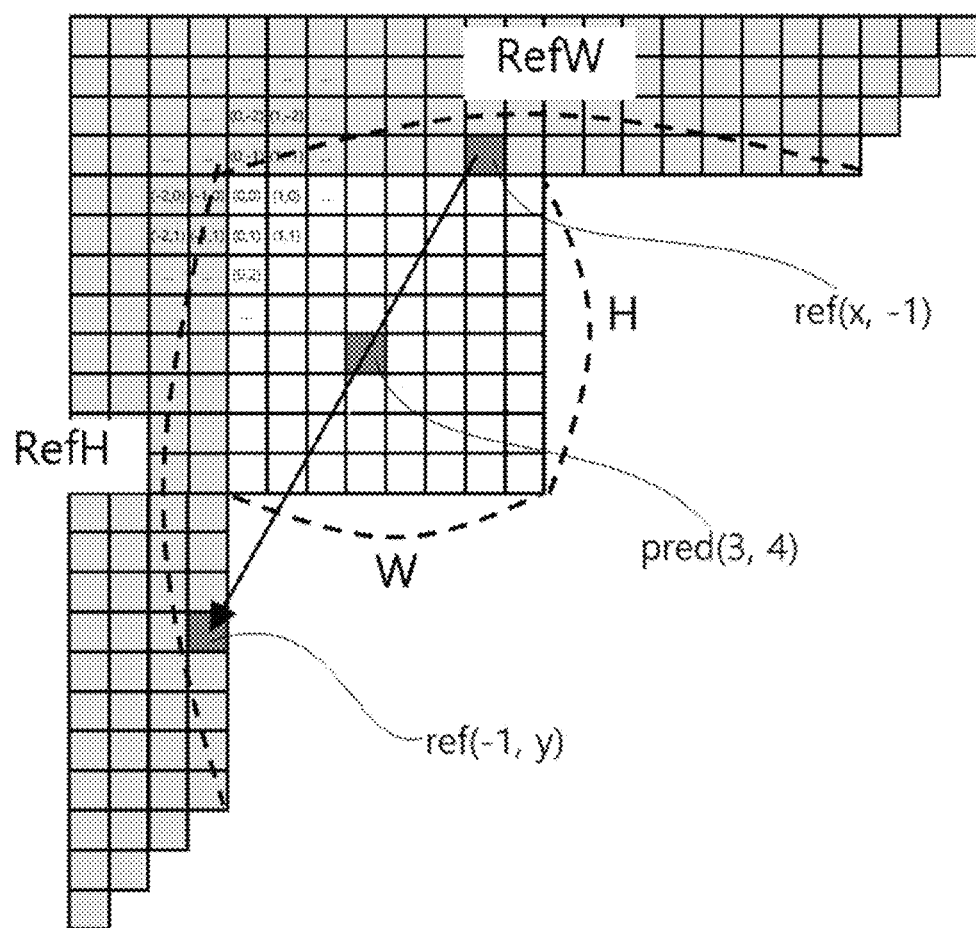
FIG. 20 is a view showing another example of performing filtering on a prediction sample by using a reference sample.

FIG. 20 is a view showing another example of performing filtering on a prediction sample by using a reference sample.

When an intra-prediction mode of a current block corresponds to a predetermined directional mode, filtering may be performed by using at least one reference sample present on the predetermined direction. For example, in an example shown in FIG. 20, filtering on a prediction sample may be performed by using a reference sample ref(x, −1) that is used for directional prediction and another reference sample ref(−1, y) that is present on the corresponding direction. Herein, the x value and the y value may be differently determined according to a directional mode.

In an example of FIG. 20, a prediction sample pred(3, 4) may be predicted by using a reference sample ref(x, −1). Alternatively, a prediction sample pred(3, 4) may be a value predicted by applying an N-tap filter to the reference sample and to an adjacent reference sample. Meanwhile, when filtering is applied to the prediction sample pred(3, 4), a reference sample ref(−1, y) may be a reference sample at one integer position. In other words, a reference sample ref(−1, y) may be one sample determined on the basis of a corresponding angle of each directional mode. For example, the reference sample may be a reference sample at an integer position adjacent to the angle line even when the sample is not positioned at an integer position on the angle line based on the angle of the directional mode.

When filtering is applied to a prediction sample predicted by using a directional prediction mode, a reference sample used for the filtering may not be present. For example, a reference sample present on the corresponding directional line may not be present within a length (range) of a reference sample configured in a process of configuring the reference sample. Herein, filtering may not be applied to the prediction sample.

A filter type may be differently determined on the basis of a size/shape of a current block. For example, a scaling value may be derived on the basis of a width and a height of a current block, and a filter coefficient value that will be applied to a reference sample may be determined by using the derived scaling value.

Comparing with a case where a width and a height of a current block are small, when a width and a height of a current block are large, a large scaling value may be used. Herein, a scaling value being large may mean that a filter coefficient value applied to a reference sample is large. In an example shown in FIG. 19, for example, when a size of a current block is 64×64, a filter coefficient value applied to ref(4, −1) may be greater than a filter coefficient value applied to a case where a size of a current block is 4×4.

A filter type may be differently determined according to a position of a filtering target sample within a current block. For example, a number of filter taps and/or a filter coefficient value may be differently determined. For example, when a position of a filtering target sample is spaced away from a left reference sample by a predetermined distance, a filter coefficient value wL of the left reference sample may become 0. Accordingly, a number of filter taps may be decreased by 1. Similarly, when a position of the filtering target sample is spaced away from an upper reference sample by a predetermined distance, a filter coefficient value wT of the upper reference sample may become 0. In addition, when a position of a filtering target sample is spaced away from both of a left reference sample and an upper reference sample by a predetermined distance, a filter coefficient value of each reference sample may become 0. In other words, filtering may not be applied to the filtering target sample.

When applying filtering to the intra-prediction sample, a scaling value may be determined on the basis of a size and/or a shape of a block.

For example, the scaling value may be scale=((Log 2(Width)+Log 2(Height)−2)>>2). Herein, Width and Height may be a width and a height of a current block, respectively.

The scaling value scale may be at least one of 2, 1, and 0.

For example, the scaling value may be determined as scale=(Log 2(Width)+Log 2(Height))>6 ? 1:0. In other words, when the sum of a width and a height of a current block is greater than 16, the scaling value may be determined as 1, and when the sum thereof is equal to or smaller than 16, the scaling value may be determined as 0.

The scaling value may be a value used for determining a weighting factor or filter coefficient (for example, at least one of wL, wT, and wTL in the Equation 6) which is applied to each reference sample.

For example, it may be wT[y]=32>>((y<<1)>>scale). Herein, the y may be a y coordinate value corresponding to a position of a filtering target prediction sample within a current block, and wT may be a filter coefficient value applied to an upper reference sample.

For example, it may be wL[x]=32>>((x<<1)>>scale). Herein, the x may be an x coordinate value corresponding to a position of a filtering target prediction sample within a current block, and wL may be a filter coefficient value applied to a left reference sample.

The filter coefficient value may be determined on the basis of a position of a filtering target prediction sample within a current block and a scaling value. Herein, when a position of the prediction sample becomes spaced away from an upper reference sample and a left reference sample by a predetermined distance, the filter coefficient value may become 0.

For example, when the scaling value is 2 and a y coordinate of the prediction sample is equal to or greater than 12, the filter coefficient value wT may become 0. Similarly, an x coordinate of the prediction sample is equal to or greater than 12, the filter coefficient value wL may become 0. In addition, when a position of the prediction sample is equal to or greater than (12, 12), the filter coefficient values wT and wL may become 0.

For example, when the scaling value is 1 and a y coordinate of the prediction sample is equal to or greater than 6, the filter coefficient value wT may become 0. Similarly, when an x coordinate of the prediction sample is equal to or greater than 6, the filter coefficient value wL may become 0. In addition, when a position of the prediction sample is equal to or greater than (6, 6), the filter coefficient values wT and wL may become 0.

For example, when the scaling value is 0 and a position of the prediction sample is equal to or greater than (3, 3), the filter coefficient values wT and wL may become 0.

A filter coefficient value applied to the reference sample being 0 may mean that the filtering is not applied. Accordingly, a number of prediction sample lines to which the filtering is applied may be determined on the basis of the scaling value. For example, when the scaling value is 2, the filtering may be applied to 12 prediction sample lines, when the scaling value is 1, the filtering may be applied to six prediction sample lines, and when the scaling value is 0, the filtering may be applied to three prediction sample lines. The prediction sample line may be a line adjacent to a reference sample.

The scaling value may be independently applied to a width and a height of a current block. In other words, scaleW based on a width W of a current block and scaleH based on a height H may be respectively derived and used.

For example, a scaling value in association with a horizontal direction may be derived as scaleW= Log 2(Width)>>2. Herein, a filter coefficient value applied to a left reference sample may be derived as wL[x]=32>>((x<<1)>>scaleW). Accordingly, when a filtering target prediction sample becomes far away from a left reference sample (for example, when x is increased), a filter coefficient value applied to the left reference sample may be decreased.

For example, a scaling value in association with a vertical direction may be derived as scaleH=Log 2(Height)>>2. Herein, a filter coefficient value applied to an upper reference sample may be derived as wT[y]=32>>((y<<1)>>scaleH). Accordingly, when a filtering target prediction sample becomes far away from an upper reference sample (for example, when y is increased), a filter coefficient value applied to the upper reference sample may be decreased.

Alternatively, when an intra-prediction mode is equal to or smaller than a mode 18, scaleW based on a width W of a current block may be used. Herein, a filter coefficient value applied to a left reference sample may be 0, and a filter coefficient value applied to an upper reference sample may be derived as wT[y]=32>>((y<<1)>>scaleW). Accordingly, when a filtering target prediction sample becomes far away from an upper reference sample (for example, when y is increased), a filter coefficient value applied to the upper reference sample may be decreased.

Alternatively, when an intra-prediction mode is equal to or greater than a mode 50, scaleH based on a height H of a current block may be used. Herein, a filter coefficient value applied to an upper reference sample may be 0, and a filter coefficient value applied to a left reference sample may be derived as wL[x]=32>>((x<<1)>>scaleH). Accordingly, when a filtering target prediction sample becomes far away from a left reference sample (for example, when x is increased), a filter coefficient value applied to the left reference sample may be decreased.

A number of lines to which filtering is applied may be generated in a table on the basis of a size and/or a shape of a current block. For example, when a width or height of a block is {2, 4, 8, 16, 32, 64, 128}, a number of prediction sample lines to which filtering is applied may be determined as {1, 2, 4, 4, 6, 0, 0}. Herein, a size of a maximum block to which the filtering is applied may be 32×32. Alternatively, a number of prediction sample line to which the filtering is applied may be determined as {0, 2, 4, 4, 6, 0, 0}. In other words, when a horizontal or vertical size of a current block corresponds to one of 4, 8, 16, and 32, filtering may be applied to the corresponding number of prediction sample lines.

A number of prediction sample lines to which the filtering is applied may be determined on the basis of a size or a horizontal/vertical length of a block. For example, when a size of a block becomes large or a horizontal/vertical length becomes large, a number of prediction sample lines to which filtering is applied may be also increased.

A number of prediction sample lines to which the filtering is applied may be different for a horizontal direction and a vertical direction. For example, when a size of a current block is 32×8, filtering may be applied to six prediction sample lines adjacent to a line in association with a horizontal direction, that is, an upper reference sample. In addition, filtering may be applied to four prediction sample lines adjacent to a line in association with a vertical direction, that is, a left reference sample.

In the present disclosure, an image encoder or image decoder performing a predetermined operation may perform an operation of determining a condition or situation for performing the corresponding operation. For example, when it is disclosed that a predetermined operation is performed when a predetermined condition is satisfied, the encoder or decoder may perform the predetermined operation after determining whether or not the predetermined condition is satisfied.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. An image decoding method performed by an image decoding apparatus, the image decoding method comprising:
   determining an intra prediction mode of a current block;
   determining a reference sample line based on whether a top boundary of the current block is located at a top boundary of a coding tree unit;
   determining reference samples of the reference sample line based on the intra prediction mode and a ratio of a width and a height of the current block; and
   generating a prediction block of the current block by performing intra prediction on the current block using the intra prediction mode and the reference samples,
   wherein, in case of the top boundary of the current block not being located at the top boundary of the coding tree unit, the reference sample line is determined based on a reference sample line index specifying the reference sample line among a plurality of reference sample lines, the reference sample line index being signaled from a bitstream, and
   wherein, in case of the top boundary of the current block being located at the top boundary of the coding tree unit, the reference sample line is determined without the reference sample line index.

2. An image encoding method performed by an image encoding apparatus, the image encoding method comprising:
   determining an intra prediction mode of a current block;
   determining a reference sample line based on whether a top boundary of the current block is located at a top boundary of a coding tree unit;
   determining reference samples of the reference sample line based on the intra prediction mode and a ratio of a width and a height of the current block; and
   generating a prediction block of the current block by performing intra prediction on the current block using the intra prediction mode and the reference samples,
   wherein, in case of the top boundary of the current block being located at the top boundary of the coding tree unit, a reference sample line index specifying the reference sample line among a plurality of reference sample lines is encoded into a bitstream, and
   wherein, in case of the top boundary of the current block not being located at the top boundary of the coding tree unit, the reference sample line index is not encoded into the bitstream.

3. A method of transmitting a bitstream generated by an encoding method, the encoding method comprising:
   determining an intra prediction mode of a current block;
   determining a reference sample line based on whether a top boundary of the current block is located at a top boundary of a coding tree unit;
   determining reference samples of the reference sample line based on the intra prediction mode and a ratio of a width and a height of the current block; and
   generating a prediction block of the current block by performing intra prediction on the current block using the intra prediction mode and the reference samples,
   wherein, in case of the top boundary of the current block being located at the top boundary of the coding tree unit, a reference sample line index specifying the reference sample line among a plurality of reference sample lines is encoded into the bitstream, and wherein, in case of the top boundary of the current block not being located at the top boundary of the coding tree unit, the reference sample line index is not encoded into the bitstream.

\* \* \* \* \*